United States Patent
Woo et al.

(10) Patent No.: US 11,544,594 B2
(45) Date of Patent: Jan. 3, 2023

(54) ELECTRONIC DEVICE COMPRISING USER INTERFACE FOR PROVIDING USER-PARTICIPATING-TYPE AI TRAINING SERVICE, AND SERVER AND METHOD FOR PROVIDING USER-PARTICIPATING-TYPE AI TRAINING SERVICE USING THE ELECTRONIC DEVICE

(71) Applicant: Sunghee Woo, San Diego, CA (US)

(72) Inventors: Sunghee Woo, San Diego, CA (US); Dongjin Park, Chicago, IL (US)

(73) Assignee: Sunghee Woo, San Diego, CA (US)

( * ) Notice: Subject to any disclaimer, the term of this patent is extended or adjusted under 35 U.S.C. 154(b) by 349 days.

(21) Appl. No.: 16/818,878

(22) Filed: Mar. 13, 2020

(65) Prior Publication Data

US 2020/0327431 A1 Oct. 15, 2020

Related U.S. Application Data

(60) Provisional application No. 62/868,984, filed on Jun. 30, 2019.

(51) Int. Cl.
*G06N 5/04* (2006.01)
*G06N 20/00* (2019.01)

(52) U.S. Cl.
CPC .............. *G06N 5/04* (2013.01); *G06N 20/00* (2019.01)

(58) Field of Classification Search
CPC .......... G06N 20/00; G06N 5/027; G06N 7/00; G06N 3/088; G06N 3/008; G06N 3/0427;
(Continued)

(56) References Cited

U.S. PATENT DOCUMENTS 8,644,990 B2 * 2/2014 Kim ...................... B25J 11/001
901/50
8,996,429 B1 * 3/2015 Francis, Jr. ........... G06F 16/214
706/45
(Continued)

FOREIGN PATENT DOCUMENTS

JP 2018-008316 A 1/2018
KR 10-2009-0086805 A 8/2009
(Continued)

OTHER PUBLICATIONS

Robotiq User Interface Instruction Manual Robotiq Inc. 2014 (Year: 2014).*
(Continued)

*Primary Examiner* — Scott L Jarrett
(74) *Attorney, Agent, or Firm* — Knobbe Martens Olson & Bear LLP

(57) ABSTRACT

An electronic device for providing a user-participating-type artificial intelligence (AI) training service is provided. The electronic device may include a user input receiving unit configured to receive, from a user of the service, initial setting user inputs about an initial setting for AI training and to receive an AI training user input for requesting for the AI training. The device may further include a processor configured to provide, through a screen of the electronic device, an initial setting UI (User Interface) receiving the initial setting user inputs and an AI training UI receiving the AI training user input, and a communication unit configured to transmit, to a service providing server, data corresponding to the initial setting user inputs and the AI training user input and to receive, from the service providing server, initial setting data and/or AI training data generated based on the transmitted data.

17 Claims, 11 Drawing Sheets

(58) Field of Classification Search
CPC ........ G06N 3/0445; G06N 3/084; G06N 5/04;
G06N 7/005; G06N 5/022; G06N 3/004;
G06N 3/08; G06N 3/0454; G06N 3/006
See application file for complete search history.

(56) References Cited

U.S. PATENT DOCUMENTS

| | | | | |
|---|---|---|---|---|
| 10,391,636 | B2* | 8/2019 | Breazeal | B25J 9/0003 |
| 10,576,380 | B1* | 3/2020 | Beltran | A63F 13/44 |
| 10,732,789 | B1* | 8/2020 | Marcinelli | G06F 40/205 |
| 10,762,414 | B1* | 9/2020 | Marggraff | G06N 3/008 |
| 10,946,281 | B2* | 3/2021 | Fear | G06N 7/00 |
| 10,963,774 | B2* | 3/2021 | Osotio | G06N 3/004 |
| 11,103,800 | B1* | 8/2021 | Roberts | A63H 13/04 |
| 11,161,236 | B2* | 11/2021 | Mallinson | G05D 1/0094 |
| 11,182,695 | B1* | 11/2021 | Kirsche | G06F 9/541 |
| 11,253,783 | B2* | 2/2022 | Lin | A63F 13/803 |
| 11,279,036 | B2* | 3/2022 | Thackston | B25J 9/1689 |
| 2006/0224546 | A1 | 10/2006 | Ballin | G06T 17/00 706/62 |
| 2015/0290795 | A1* | 10/2015 | Oleynik | A47J 36/321 700/257 |
| 2016/0379519 | A1* | 12/2016 | Gupta | A63H 30/04 434/118 |
| 2017/0243132 | A1* | 8/2017 | Sainani | H04L 41/20 |
| 2017/0291295 | A1* | 10/2017 | Gupta | B25J 9/0081 |
| 2017/0323345 | A1* | 11/2017 | Flowers | G06Q 30/0255 |
| 2018/0189228 | A1* | 7/2018 | Park | G06F 15/76 |
| 2019/0138904 | A1* | 5/2019 | Millius | H04M 1/72403 |
| 2019/0327330 | A1* | 10/2019 | Natarajan | G06F 16/90332 |
| 2019/0340524 | A1* | 11/2019 | Kirchhoff | G06N 5/043 |
| 2020/0125586 | A1* | 4/2020 | Rezaeian | G06N 7/005 |
| 2020/0134370 | A1* | 4/2020 | Chopra | G06N 5/003 |
| 2020/0327431 | A1* | 10/2020 | Woo | G06N 5/04 |
| 2021/0023711 | A1* | 1/2021 | Lee | B25J 9/163 |

FOREIGN PATENT DOCUMENTS

| | | |
|---|---|---|
| KR | 10-1927050 B1 | 12/2018 |
| KR | 10-1940928 B1 | 1/2019 |

OTHER PUBLICATIONS

Biggs, Geoffrey et al., A Survey of Robot Programming Systems Proceedings of the Australian conference on robots and automation, vol. 1, 2003 (Year: 2003).*

Tekno—The Robotic Puppy—Owners Manual Tekno, Apr. 2012 (Year: 2012).*

CHiP—User Manuarl WowWee Inc, 2015 (Year: 2015).*

Spranger, Jordi et al., Human-Machine Interface for Remote Training of Robot Tasks IEEE Instrumentation and Measurement Society, 2018 (Year: 2018).*

Weintrop, David et al., Evaluating CoBlox: A Comparative Study of Robotics Programming Environments for Adult Novices CHI 2018, Apr. 21-26, 2018 (Year: 2018).*

Marion, P. et al., Director: A User Interface Designed for Robot Operation with Shared Autonomy Journal of Field Robotics, 2016 (Year: 2016).*

Huang, Justin et al., Code3: A system for End-to-End Programming of Mobile Manipulator Robots for Novices and Experts HRI'17, ACM, Mar. 6-9, 2017 (Year: 2017).*

Steinmetz, Franz et al., RAZER—A HRI for Visual Task-Level Programming and Intuitive Skill Parameterization IEEE Robotics and Automation Letters, vol. 3, No. 3, Jul. 2018 (Year: 2018).*

* cited by examiner

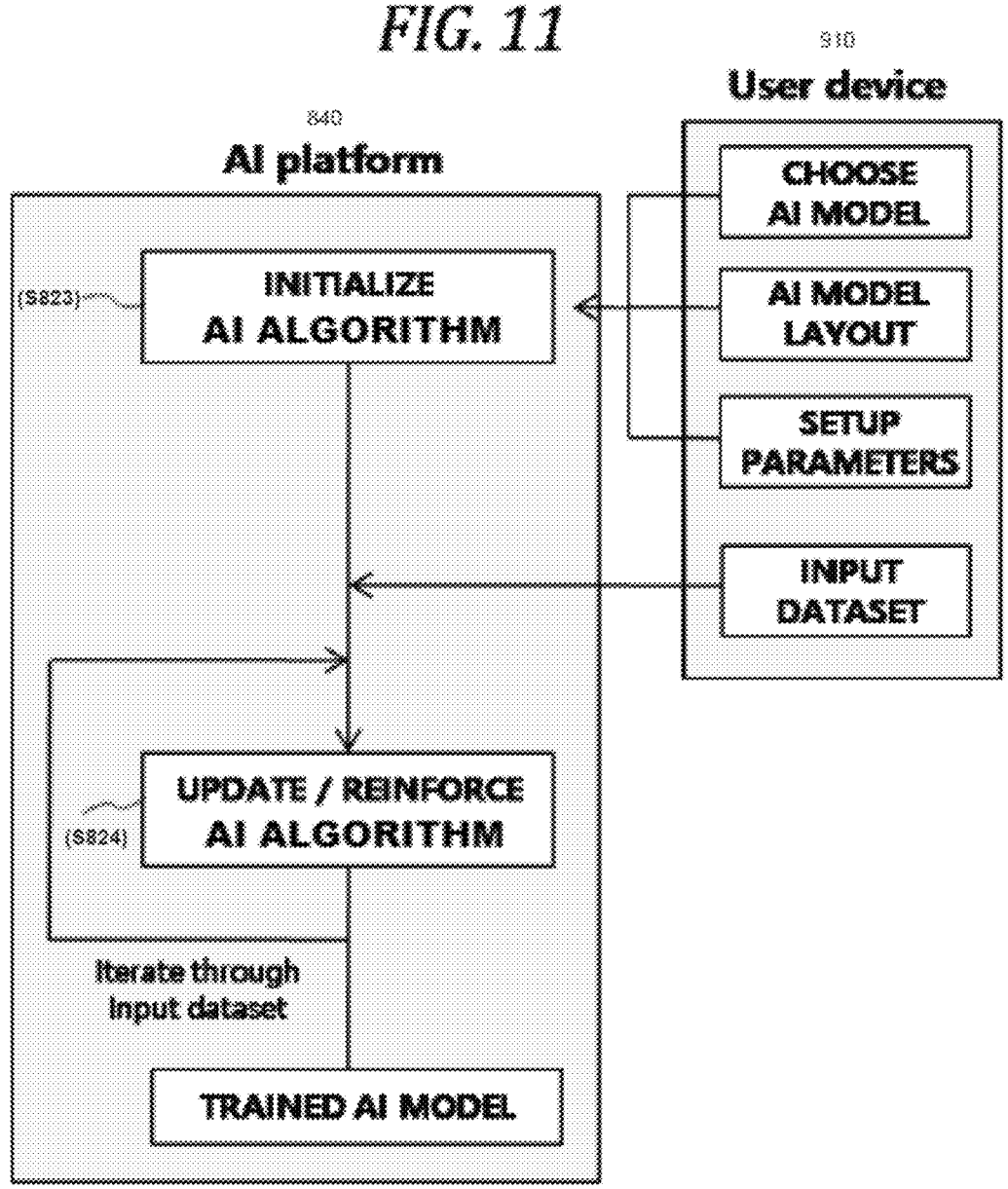

ELECTRONIC DEVICE COMPRISING USER INTERFACE FOR PROVIDING USER-PARTICIPATING-TYPE AI TRAINING SERVICE, AND SERVER AND METHOD FOR PROVIDING USER-PARTICIPATING-TYPE AI TRAINING SERVICE USING THE ELECTRONIC DEVICE

CROSS-REFERENCE TO RELATED APPLICATION(S)

This application claims priority under 35 U.S.C. 119 of U.S. Provisional Patent Application No. 62/868,984 filed on Jun. 30, 2019 and of Korean Patent Application No. 10-2019-0042310 filed on Apr. 11, 2019 in the Korean Intellectual Property Office, the entire disclosure of both of which are hereby incorporated by reference.

TECHNICAL FIELD

Various embodiments of the present disclosure relate to a service performing artificial intelligence (AI) training for a specific subject. In particular, the various embodiments of the present disclosure relate to an electronic device, a service providing server, and a system for performing the AI training through a user input. Without coding directly by a user of the service, the user can conveniently utilize the present disclosure.

BACKGROUND

After the third wave of Alvin Toffler, lots of experts predict and refer the fourth wave. One of strong candidates is an AI (Artificial Intelligence.) Actually, bio industries, 3D printers, robots, AI, and smartphones were chosen as candidates of the fourth wave at the Swiss Davos Forum on 20 Jan. 2016. There are some opinions that mankind will be relieved from labor thanks to development of robots and AI.

The AI is artificially embodied from at least of or all of human intelligence, the term "AI" was first mentioned by John McCarthy at a workshop held by Marvin Minsky, Claude Shannon, etc. who greatly contributed to the AI and information theory at Dartmouth in 1956. However, concept of the AI existed even earlier. For example, Alan Turing suggested the possibility of "thinking machine" and the Turing test in 1950, and the beginning neural network model was suggested in 1943.

In the middle of the 20th century, AI research was such an innovative study that received lots of attention and had been studied continuously. The AI can process neural language and solve complex mathematics problems by using computers, which originally thought to be an area of human. Of course, the AI industries were a huge field that built a market size of over thousand million dollars in 1980.

After 21th century, Geoffrey Hinton's thesis on deep learning was announced so that unsupervised learning became available that had been thought to be impossible. Furthermore, outputs surpassing a level of human was coming down the pike. The current AI in addition to AlphaGo has a higher recognition rate for human faces and objects. Thus, in the field of the AI, perception that the AI can surpass human ability at the high speed is spread.

SUMMARY

Various embodiments of the present disclosure are to address at least the above-mentioned problems and/or disadvantages and to provide at least the advantages described below.

The various embodiments of the present disclosure are devised to providing an electronic device, a service providing server, and a system providing a service of user-participating-type AI (Artificial Intelligence) training. According to various embodiments, without complex coding for AI training by a user who is even not an expert, the AI training is simply performed by receiving user inputs through a predetermined platform resulting in improving user-convenience.

According to an embodiment of the present disclosure, an electronic device for providing a user-participating-type AI (Artificial Intelligence) training service is provided. The electronic device may include a user input receiving unit configured to receive, from a user of the service, initial setting user inputs about an initial setting for AI training and to receive an AI training user input for requesting for the AI training; a processor configured to provide, through a screen of the electronic device, an initial setting UI (User Interface) receiving the initial setting user inputs and an AI training UI receiving the AI training user input; and a communication unit configured to transmit, to a service providing server, data corresponding to the initial setting user inputs and the AI training user input and to receive, from the service providing server, initial setting data and/or AI training data generated based on the transmitted data. The initial setting user inputs may include a user input selecting a subject for the AI training, a user input selecting an AI algorithm from AI algorithms, a user input determining a type of input data for the AI training, and a user input determining a plurality of behavior patterns of the subject.

According to various embodiments of the present disclosure, the communication unit may be further configured to receive, from the service providing server, information on an AI training algorithm generated as a result of the AI training, and the information on the AI training algorithm may be exclusive information for a user account of the user.

According to various embodiments of the present disclosure, the communication unit may be configured to receive, from the service providing server, the information on the AI training algorithm in response to a user input requesting for the information on the AI training algorithm, and the information on the AI training algorithm may be generated by the service providing server if the number of the AI training being executed exceeds a predetermined threshold.

According to various embodiments of the present disclosure, the information on the AI training algorithm may be transmitted to an external device and allows the external device to be operated based on the information on the AI training algorithm.

According to various embodiments of the present disclosure, the type of input data may include text information, voice information, and image information, and a data size of input data included in the AI training user input may be limited within a predetermined threshold.

According to various embodiments of the present disclosure, the user input receiving unit may be further configured to receive an invitation user input allowing another user to participate in the AI training, the communication unit may be further configured to transmit, to another electronic device of the another user, data corresponding to the invitation user input directly or through the service providing server, and the AI training may be further executed through the another electronic device.

According to various embodiments of the present disclosure, the information on the AI training algorithm may be corresponding to a result of the AI training executed through the electronic device and the another electronic device, and the information on the AI training algorithm may be exclusive information for user accounts of the user and the another user.

According to various embodiments of the present disclosure, the initial setting user inputs may further include determining parameter and structure provided based on the selected AI algorithm, and the parameter may include the number of layers for the AI algorithm, node for each of layers, function, and the number of iterations.

According to various embodiments of the present disclosure, the plurality of behavior patterns may include predetermined behavior patterns and/or an additional behavior pattern directly input by the user, and the predetermined behavior patterns may include an additional behavior pattern directly input by another user.

According to various embodiments of the present disclosure, the processor may be further configured to reduce a data size of input data input through the AI training UI by preprocessing the input data.

According to various embodiments of the present disclosure, information on the AI training algorithm generated as a result of the AI training may be shared with other users using the service.

According to an embodiment of the present disclosure, a service providing server for providing a user-participating-type AI (Artificial Intelligence) training service is provided. The service providing service providing server may include a communication unit configured to receive, from an electronic device of a user using the service, a request for an initial setting for AI training and a request for the AI training; and a processor configured to execute, based on the received request, the initial setting for the AI training and the AI training, and to transmit, to the electronic device, initial setting data and/or AI training data respectively corresponding to the executed initial setting and the executed AI training. The request for the initial setting may include a subject for the AI training, an AI algorithm from AI algorithms, a type of input data for the AI training, and a plurality of behavior patterns of the subject.

According to various embodiments of the present disclosure, the communication unit may be further configured to receive, from the electronic device, a request for information on an AI training algorithm, the processor may be further configured to generate the information on the AI training algorithm as a result of the AI training, and the information on the AI training algorithm may be exclusive information for a user account of the user.

According to various embodiments of the present disclosure, the processor may be configured to generate the information on the AI training algorithm if the number of the AI training being executed exceeds a predetermined threshold.

According to various embodiments of the present disclosure, the communication unit may be further configured to receive, from the electronic device, an invitation request for allowing another user to participate in the AI training, and the processor may be further configured to group the user and the another user for the AI training.

According to an embodiment of the present disclosure, a system for providing a user-participating-type AI (Artificial Intelligence) training service is provided. The system may include a first electronic device configured to provide, through a screen of the first electronic device, an initial setting UI (User Interface) and an AI training UI, and to receive, from a user of the service, initial setting user inputs about an initial setting for AI training and an AI training user input for requesting for the AI training; and a service providing server configured to receive, from the first electronic device, a request for the initial setting and the AI training, to execute, based on the received requests, the initial setting for AI training and AI training, and to transmit, to the first electronic device, initial setting data and/or AI training data corresponding to the executed initial setting and AI training. The initial setting user inputs may include a user input selecting a subject for the AI training, a user input selecting an AI algorithm from AI algorithms, a user input determining a type of input data for the AI training, and a user input determining a plurality of behavior patterns of the subject.

According to various embodiments of the present disclosure, the first electronic device may be further configured to receive, from the service providing server, a user input requesting for information on an AI training algorithm, and to transmit, to the service providing server, a request for the information on the AI training algorithm, and the service providing server may be further configured to generate the information on the AI training algorithm as a result of the AI training if the number of the AI training being executed exceeds a predetermined threshold, and to transmit, to the first electronic device, the information on an AI training algorithm.

According to various embodiments of the present disclosure, the information on the AI training algorithm may be exclusive information for a user account of the user.

According to various embodiments of the present disclosure, the system may further include a second electronic device of another user using the service. The first electronic device may be further configured to receive an invitation user input allowing the another user to participate in the AI training, and to transmit, to the service providing server, an invitation request corresponding to the invitation user input, and the service providing server may be further configured to group the user and the another user for the AI training.

According to various embodiments of the present disclosure, the service providing server may be further configured to receive, from the first electronic device or the second electronic device, another request for the AI training, to execute the AI training in response to the received another request, to generate AI training data corresponding to the executed AI training, and to transmit, to the first electronic device and the second electronic device, the generated AI training data.

According to an embodiment of the present disclosure, a method, performed by an electronic device, of providing a user-participating-type AI (Artificial Intelligence) training service is provided. The method may include providing, through a screen of the electronic device, an initial setting UI (User Interface); receiving, from a user of the service, initial setting user inputs about an initial setting for AI training; transmitting, to a service providing server, data corresponding to the initial setting user inputs; providing, through a screen of the electronic device, an AI training UI; receiving, from the user of the service, an AI training user input for requesting for the AI training; transmitting, to the service providing server, data corresponding to the AI training user input; and receiving, from the service providing server, initial setting data and/or AI training data generated based on the transmitted data. The initial setting user inputs may include a user input selecting a subject for the AI training, a user input selecting an AI algorithm from AI algorithms, a user input determining a type of input data for the AI training, and a user input determining a plurality of behavior patterns of the subject.

According to an embodiment of the present disclosure, a method, performed by a service providing server, of providing a user-participating-type AI (Artificial Intelligence) training service is provided. The method may include receiving, from an electronic device of a user using the service, a request for an initial setting for AI training and a request for the AI training; executing, based on the received request, the initial setting for the AI training and the AI training; and transmitting, to the electronic device, initial setting data and/or AI training data respectively corresponding to the executed initial setting and the executed AI training. The request for the initial setting may include a subject for the AI training, an AI algorithm from AI algorithms, a type of input data for the AI training, and a plurality of behavior patterns of the subject.

According to an embodiment of the present disclosure, a method, performed by a system including a first electronic device and a service providing server, of providing a user-participating-type AI (Artificial Intelligence) training service is provided. The method may include providing, by the first electronic device, through a screen of the first electronic device, an initial setting UI (User Interface) and an AI training UI; receiving, by the first electronic device, from a user of the service, initial setting user inputs about an initial setting for AI training and an AI training user input for requesting for the AI training; receiving, by the service providing server, from the first electronic device, a request for the initial setting and the AI training; executing, by the service providing server, based on the received requests, the initial setting for the AI training and the AI training; and transmitting, by the service providing server, to the first electronic device, initial setting data and/or AI training data respectively corresponding to the executed initial setting and the executed AI training. The initial setting user inputs may include a user input selecting a subject for the AI training, a user input selecting an AI algorithm from AI algorithms, a user input determining a type of input data for the AI training, and a user input determining a plurality of behavior patterns of the subject.

Other embodiments, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other embodiments, features, and advantages of certain embodiments of the present disclosure will be more apparent from the following description taken in conjunction with the accompanying drawings.

FIG. 11 is a drawing illustrating a use case of the platform in training a Neural Network based AI algorithms according to embodiments of the present disclosure.

Throughout the drawings, it should be noted that like reference numbers are used to depict the same or similar elements, features, and structures.

DETAILED DESCRIPTION

Figure 1:
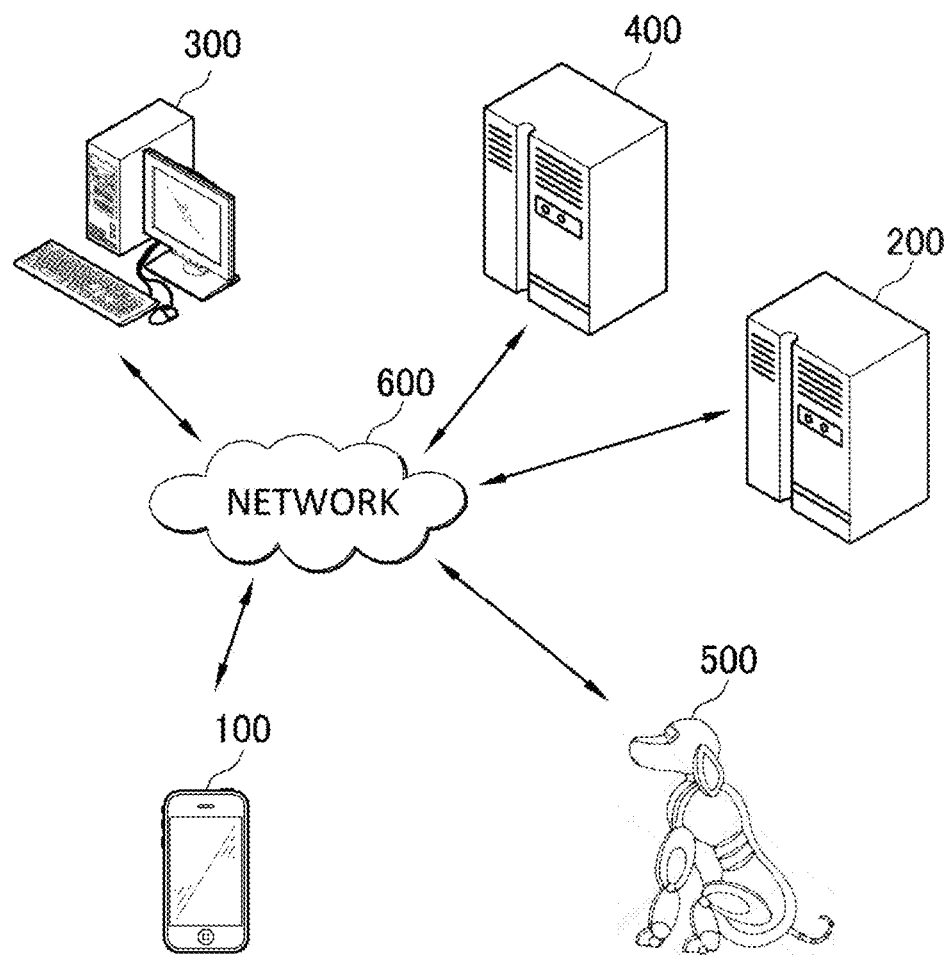
FIG. 1 is a drawing illustrating a system, including electronic devices and a service providing server, providing a user-participating-type AI (Artificial Intelligence) training service according to various embodiments of the present disclosure.

Hereinafter, the present disclosure is described with reference to the accompanying drawings. However, the present disclosure is not intended to be limited to the specific embodiments, and it is understood that it should include various modifications, equivalents, and/or alternatives according to various embodiments of the present disclosure. With respect to the descriptions of the drawings, like reference numerals refer to like elements.

In the disclosure disclosed herein, the expressions "have", "may have", "include" and "comprise", or "may include" and "may comprise" used herein indicate existence of corresponding features (e.g., elements such as numeric values, functions, operations, or components) but do not exclude presence of additional features.

In the disclosure disclosed herein, the expressions "A or B", "at least one of A and/or B", or "one or more of A and/or B", and the like used herein may include any and all combinations of one or more of the associated listed items. For example, the term "A or B", "at least one of A and/or B", or "one or more of A and/or B" may refer to all of the case (1) where at least one A is included, the case (2) where at least one B is included, or the case (3) where both of at least one A and at least one B are included.

The expressions such as "1st", "2nd", "first", or "second", and the like used in various embodiments of the present disclosure may refer to various elements irrespective of the order and/or priority of the corresponding elements, but do not limit the corresponding elements. The expressions may be used to distinguish one element from another element. For instance, both "a first electronic device" and "a second electronic device" indicate different electronic devices from each other irrespective of the order and/or priority of the corresponding elements. For example, a first component may be referred to as a second component and vice versa without departing from the scope of the present disclosure.

It will be understood that when an element (e.g., a first element) is referred to as being "(functionally or communicatively) coupled with/to" or "connected to" another element (e.g., a second element), it can be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used as, for example, the expression "suitable for", "having the capacity to", "designed to", "adapted to", "made to", or "capable of". The term "configured to" should not mean "only specifically designed to." The expression "a device configured to" may mean that the device is "capable of" operating by itself, or together with another device or other components. For example, a "processor configured to perform A, B, and C" may mean a dedicated processor (e.g., an embedded processor) for performing a corresponding operation or a generic-purpose processor (e.g., a CPU (Central Processing Unit) or an application processor) which may perform corresponding operations by executing one or more software programs which are stored in a memory device.

Terms used in this specification are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

FIG. 1 is a drawing illustrating a system, including electronic devices and a service providing server, providing a user-participating-type AI (Artificial Intelligence) training service (hereinafter, the AI training service) it according to various embodiments of the present disclosure. Referring to FIG. 1, the system may include a first electronic device 100, a service providing server 200, a second electronic device 300, a contents server 400, an external device 500, and a network 600. First electronic device 100 and second electronic device 200 according to various embodiments of the present disclosure may include at least one of smart-phones, smart-pads, tablet PCs (Personal Computers), desktop PCs, laptop PCs, netbook computer, workstations, wearable devices (e.g., HMDs (Head-Mounted-Devices) or smart-watches), TV boxes (e.g., Samsung HomeSync™, Apple TV™, or Google TV™), or game consoles (e.g., Xbox™, PlayStation™, or Switch™.)

First electronic device 100 may receive items to be provided for an initial setting for AI training from a user using the service. The items may include a subject for the AI training, an AI algorithm selected from AI algorithms, a type of input data for the AI training, and a plurality of behavior patterns of the subject to be used for the AI training.

According to various embodiments of the present disclosure, the subject may not be limited to a specific type. For example, the subject may include persons, pets, various comic characters, various movie characters, celebrities, toys, or robots, etc. According to various embodiments of the present disclosures, first electronic device 100 may determine specific parts for the subject. For example, if a pet puppy is selected for the subject, first electronic device 100 may determine a breed, an age, a sex, a size, and details of a shape (e.g., eyes, a nose, a mouth, ears, color for hair, or a tail, etc.) for the pet puppy.

According to various embodiments of the present disclosure, the AI algorithms may include a perceptron, a neural network, a SVM (Support Vector Machine), and a deep learning. However, the AI algorithms may not be limited to the above kinds of algorithms and may include other algorithms to be developed later.

According to various embodiments of the present disclosure, the type of input data for the AI training may include a text, a voice, an image, and a video. However, the type of the input data may not exclude a sound except the voice. For example, the type of the input data may include the voice, a sound of animals, a sound of environments, a sound of musical instruments, an electric sound, etc.

According to various embodiments of the present disclosure, the plurality of behavior patterns of the subject may be predetermined patterns for the behaviors of the subject and may be different depending on which subjects are selected. For example, if a pet puppy is selected for the subject, the behavior patterns may include rolling, sitting down, standing up, barking, running, and giving a paw, etc. Hereinafter, it will be described that the subject for the AI training is a pet puppy as an example. However, the subject according to various embodiments of the present disclosure may not be limited to the pet puppy, thus other components may not be limited to components corresponding to the pet puppy.

According to various embodiments of the present disclosure, first electronic device 100 may provide, through a display device, the user with an initial setting UI (User Interface) to receive user inputs, from the user, selecting the subject, the AI algorithm, the type of input data, and the behavior patterns. First electronic device 100 may provide the initial setting UI by using data pre-stored in a memory of first electronic device 100 or by using corresponding to data received from service providing server 200. The subject, the AI algorithm, the type of input data, and the behavior patterns may be displayed on the initial setting UI all at once or each of the subject, the AI algorithm, the type of input data, and the behavior patterns may be displayed on the respective UIs. According to various embodiments of the present disclosure, the display device may include, for example, a display embedded or installed on an electronic device (e.g., a LCD (Liquid Crystal Display), a LED (Light Emitting Diode) display, an OLED (Organic LED) display, a MEMS (Micro-Electro-Mechanical Systems) display, or an electronic paper display, etc.), a LED monitor, a LCD monitor, IPTV, Smart TV, or a projector connected to the electronic device directly or indirectly. Hereinafter, it will be described that the display device is a screen of first electronic device 100 as an example.

First electronic device 100 may transmit, to service providing server 200, data corresponding to the received items for the initial setting. According to various embodiments of the present disclosure, service providing server 200 may be operated as a cloud server employed by a company providing the AI training service.

Service providing server 200 may execute the initial setting for the AI training by using data, received from first electronic device 100, corresponding to the items to be provided for the initial setting.

According to various embodiments of the present disclosure, service providing server 200 may execute the initial setting after receiving respectively each of or receiving sequentially at least two of, data corresponding to the subject, the AI algorithm, the type of the input data, and the behavior patterns. However, receiving order of a plurality of the data is not limited to the data corresponding to the subject, the AI algorithm, the type of the input data, and the behavior patterns in that order.

According to various embodiments of the present disclosure, first electronic device 100 may further receive, from the user, user input determining parameter and structure provided based on the selected AI algorithm. The parameter may include at least one of the number of layers for the AI algorithm, node for each of layers, function, and the number of iterations. According to various embodiments of the present disclosure, the structure may indicate arrangement of the node, function and the number of iterations. Although the same algorithm and the same node, the same function, and the same number of iterations is determined, result of AI trainings may be different based on the arrangement. Thus, various embodiments of the present disclosure may authorize the user to determine the structure for the AI algorithm.

Because determining the parameter and the structure may be unfamiliar to the user who is not an expert, according to various embodiments of the present disclosure, first electronic device 100 or service providing server 200 may preset a default value of the parameter and the structure for user convenience. If first electronic device 100 or service providing server 200 do not receive the user input determining the parameter and the structure or receive a user input authorizing determination of the parameter and the structure to first electronic device 100 or service providing server 200, the default value may be the value for the parameter and the structure.

According to various embodiments of the present disclosure, the default value for the parameter and the structure may be various based on the selected subject, AI algorithm, type of the input data, or behavior patterns.

According to various embodiments of the present disclosure, selecting a plurality of behavior patterns may be not only selecting behavior patterns among the predetermined behavior patterns but also requesting for another behavior pattern that is not included in the predetermined behavior patterns by inputting the another behavior pattern on requesting area of the initial setting UI. According to various embodiments of the present disclosure, the predetermined behavior patterns may include a behavior pattern that any user requested for on the requesting area of the initial setting UI of his/her own electronic device. For example, if the user requests "turning a somersault" of the pet puppy through the requesting area, service providing server 200 may generate the behavior pattern "turning a somersault," and the behavior pattern "turning a somersault" may be suggested to other users with the predetermined behavior patterns. According to various embodiments of the present disclosure, a newly added behavior pattern may be suggested differently with the predetermined behavior patterns. For example, the newly added behavior pattern may be suggested to other users as a recommendation behavior pattern.

According to various embodiments of the present disclosure, the requesting area, or the recommendation behavior pattern, etc. may be suggested only to users paying for the service in contrast to users subscribing free service.

First electronic device 100 may receive an AI training user input requesting for the AI training for the selected subject. The AI training user input may include input data based on the selected type of the input data and one of the selected behavior patterns. For example, if the selected type of the input data is the text and the selected behavior patterns include sitting down, barking, and rolling, the user may input a text "sit down" and select the behavior pattern "sitting down" to request for the AI training. However, the user may input the text "sit down" and select the behavior pattern "rolling" to request for the AI training.

According to various embodiments of the present disclosure, similarly to the initial setting UI, first electronic device 100 may provide AI training UI and receive the AI training user input through the AI training UI.

First electronic device 100 may transmit, to service providing server 200, the received AI training user input, and service providing server 200 may execute the AI training based on the received AI training user input. Basically, if the AI training is once executed, result of the AI training cannot be deleted or modified because of a property of AI algorithm. Thus, if AI training which matches the text "sit down" with the behavior pattern "rolling" is mistakenly executed, more AI training which matches the text "sit down" with the behavior pattern "sitting down" may practically overwrite the result of the AI training.

Service providing server 200 may transmit, to first electronic device 100, data corresponding to the executed AI training. If the conducted AI training include the behavior pattern "sitting down" matched with the text "sit down", first electronic device 100 may provide, through the screen, the user with a scene that the puppy pet is sitting down in response to the text "sit down" by using the received data corresponding to the executed AI training.

According to various embodiments of the present disclosure, first electronic device 100 may limit a data size of the input data included in the AI training user input within a predetermined threshold. If the type of the input data is the text, first electronic device 100 may, for example, allow the text under 10 letters. If the type of the input data is the voice, first electronic device 100 may, for example, allow the voice under 3 seconds. Furthermore, if the type of the input data is the image, first electronic device 100 may, for example, limit a resolution or a data size of the image. If the type of the input data is the video, first electronic device 100 may limit a resolution, a data size, or a length of the video.

According to various embodiments of the present disclosure, if the type of the input data is the voice, service providing server 200 may use the voice for the AI training as identification information for the user. Thus, service providing server 200 may not execute the AI training for the puppy pet in case of receiving a voice of another user. According to various embodiments of the present disclosure, the voice may include timbre, loudness, pitch, or tone as the identification information. Furthermore, if the type of the input data is the voice, first electronic device 100 may request for repeating the voice for consistency of the AI training.

According to various embodiments of the present disclosure, if the type of the input data is the image, service providing server 200 may retrieve similar images from contents server 400 and process the similar images equally to the input image. For example, service providing server 200 may execute AI training for the retrieved similar images as well as the input image by matching with a behavior pattern matched with the input image. According to various embodiments of the present disclosure, contents server 400 may be a server operated by a company providing the AI training service or another company providing image search service from an input image, for example, Google™.

According to various embodiments of the present disclosure, first electronic device 100 may reduce a data size of the input data by preprocessing the input data. Through the preprocessing first electronic device may shorten a response time in terms of communication with service providing server 200. For example, if the type of the input data is the voice, the preprocessing may be analyzing and converting the voice to the text. If the type of the input data is the image, the preprocessing may be converting meaning of the image to the text through image processing. Otherwise, the preprocessing may be reducing the data size by simply changing file format of, reducing a bit rate or definition of, or file compressing the voice, the image, or the video.

According to various embodiments of the present disclosure, if needed, first electronic device 100 may encrypt the input data and transmit the encrypted input data to service providing server 200 if the input data includes personal information. In this case, service providing server 200 may decrypt the input data by using an encryption key or OTP (One Time Password.)

According to various embodiments of the present disclosure, first electronic device 100 may receive, from the user, an invitation user input requesting for making another user participate in the AI training for the subject and transmit, to service providing server 200, data corresponding to the invitation user input. According to various embodiments of the present disclosure, an application providing the AI training service installed on first electronic device 100 may be interlocked with a phone book application or a SNS (Social Networking Service) application. Thus, the user may input the invitation user input, through the application providing the AI training service, selecting the another user stored on the phone book application or registered as a friend on the SNS application.

According to various embodiments of the present disclosure, service providing server 200 may transmit, to another user's electronic device (e.g., second electronic device 300,) a request for inviting the another user. If second electronic device 300 accepts the invitation, service providing server 200 may organize the user and another user as one group. In this case, the another user may execute the AI training by using second electronic device 300 under the initial setting set by the user. Furthermore, logs of AI training executed by each of first electronic device 100 and second electronic device 300 may be shared between first electronic device 100 and second electronic device 300. According to various embodiments of the present disclosure, each of the user and the another user may watch the logs of AI training executed by each of first electronic device 100 and second electronic device 300 on a chat room generated by service providing server 200.

According to various embodiments of the present disclosure, first electronic device 100 may receive, from the user, a user input requesting for information on an AI training algorithm. The information on the AI training algorithm may be exclusive information for a user account of the user. According to various embodiments of the present disclosure, the information on the AI training algorithm may be generated as a result of the AI training if the number of the AI training being executed exceeds a predetermined threshold. The information on the AI training algorithm may be programming/coding data corresponding to the AI training executed so far or data simply showing a training state of the subject as the result of the AI training.

According to various embodiments of the present disclosure, first electronic device 100 may transmit, to service providing server 200, a request for the information on the AI training algorithm based on the received user input requesting for the information on the AI training algorithm. Service providing server 200 may generate the information on the AI training algorithm and transmit the generated information on the AI training algorithm to first electronic device 100. According to various embodiments of the present disclosure, the generated information on the AI training algorithm may be transmitted to first electronic device 100 with encryption.

According to various embodiments of the present disclosure, service providing server 200 may generate and transmit, to first electronic device 100, the information on the AI training algorithm if a predetermined condition is met. For example, service providing server 200 may generated the information on the AI training algorithm based on accuracy or reliability of a result of the AI training. If the AI training is executed by matching the text "sit down" with the behavior pattern "rolling," service providing server 200 may not generate the information on the AI training algorithm. If the text "sit down" is correctly matched with the behavior pattern "sitting down", but a text "sit" is matched with the behavior "rolling", service providing server 200 may not generate the information on the AI training algorithm because of inconsistency.

According to various embodiments of the present disclosure, the transmitting the information on the AI training algorithm may be a handover of a copyright of the information on the AI training algorithm. If the AI training is executed by the user and another user, the information on the AI training algorithm may belong to each of the user and another user and the copyright may be shared between the user and the another user.

Service providing server 200 may share the result of the AI training executed by the user with other users of the AI training service. According to various embodiments of the present disclosure, the result of the AI training may be the information on the AI training algorithm. However, the result of the AI training may be other information different from the information on the AI training algorithm. For example, the other users of the AI training service may bring data of the pet puppy AI-trained by the user and check that what would the pet puppy do when receiving input data based on the result of the AI training although the other users cannot execute the AI training for the pet puppy. That is to say, it is similar to a document executed through a program allowing reading the document except editing (e.g. Adobe Acrobat Reader™.) According to various embodiments of the present disclosure, the result of the AI training may include the number of the AI training being executed. The number of the AI training may help the other users make a judgement whether the AI training is sufficiently executed or not and induce the other users to use the information on the AI training algorithm.

External device 500, for example, may be various forms of robots and be operated by using the AI algorithm. First electronic device 100 may transmit, to external device 500, the information on the AI training algorithm received from service providing server 200. The information on the AI training algorithm may make the robot to act based on the result of the AI training executed by the user. According to various embodiments of the present disclosure, first electronic device 100 may be operated as an input device (e.g., a remote controller) for external device 500. The user may input the input data, such as the text, the voice, the image, or the video to act external device 500 as the AI-trained subject for the AI training. In this case, first electronic device 100 may provide the user with a UI controlling external device 500 on the screen. According to various embodiments of the present disclosure, if the type of the input data is the voice, a microphone installed in external device 500 may act as the input device.

According to various embodiments of the present disclosure, first electronic device 100 may request service providing server 200 to transmit the information on the AI training algorithm to external device 500. Otherwise, first electronic device 100 may directly transmit the information on the AI training algorithm to external device 500. In this case, first electronic device 100 may use near field communication to transmit the information on the AI training algorithm.

According to various embodiments of the present disclosure, the information on the AI training algorithm that first electronic device 100 or service providing server 200 transmits may be encrypted information.

According to various embodiments of the present disclosure, external device 500 may be a ready-made product, or a product customized to fit the subject corresponding to the initial setting. For example, service providing server 200 may request a manufacturer to craft the product customized to the subject. In this case, service providing server 200 may transmit the request for the customized product in case of permission of the user.

Network 600 may mean a connection structure which allows nodes such as terminals and servers to exchange information and may include at least one of telecommunications networks, for example, a computer network (e.g., LAN or WAN), the Internet, or a telephone network. According to various embodiments of the present disclosure, first electronic device 100, service providing server 200, second electronic device 300, contents server 400, and external device 500 may be connected to network 600 and communicate to each other through a wireless communication and a wired communication. The wireless communication may include at least one of, for example, LTE, LTE-A, CDMA, WCDMA, UMTs, WiBro, GSM, or the like, as cellular communication protocol. Furthermore, the wireless communication may include, for example, a local area network. The local area network may include at least one of a Wi-Fi, NFC (Near Field Communication), a GPS (Global Positioning System), or the like. The wired communication may include at least one of, for example, a USB (Universal Serial Bus), a HDMI (High Definition Multimedia Interface), a RS-132 (Recommended Standard-132), or a POTS (Plain Old Telephone Service).

Figure 2:
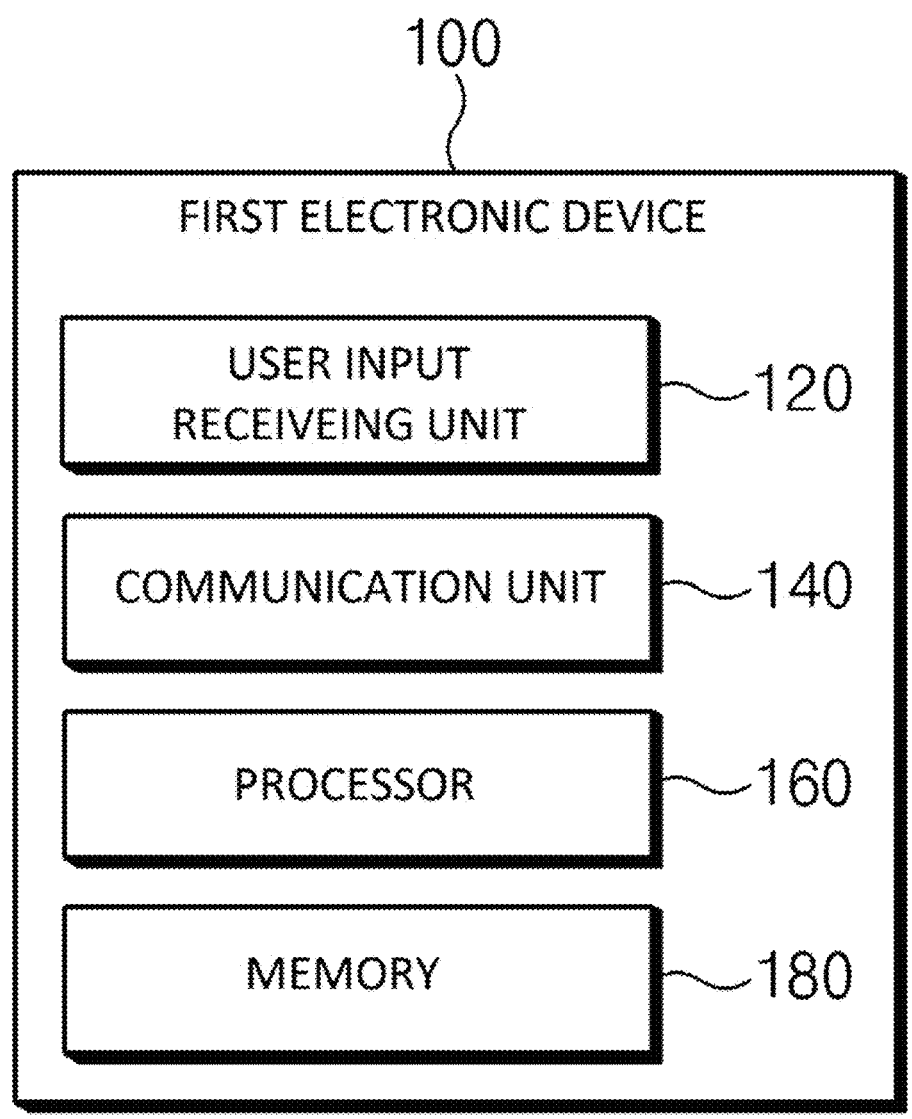
FIG. 2 is a block diagram illustrating a configuration of an electronic device according to various embodiments of the present disclosure.

FIG. 2 is a block diagram illustrating a configuration of an electronic device according to various embodiments of the present disclosure. Referring to FIG. 2, first electronic device 100 may include a user input receiving unit 120, a communication unit 140, a processor 160, and a memory 180. Herein, first electronic device 100 shown in FIG. 2 may be only an implementation example. Various modifications are possible according to the elements shown in FIG. 2. For example, first electronic device 100 may further include user interfaces for receiving any instruction or information from a user of first electronic device 100. According to various embodiments of the present disclosure, through a display device, first electronic device 100 may display a UI (User Interface) to provide the AI training service and receive a user input. The display device may be a wired or wireless device connected to first electronic device 100 or an integral device installed on first electronic device 100.

User input receiving unit 120 may receive a user input from a user of the AI training service. The user input may include a plurality of initial setting user inputs to be provided to initial setting for AI training and an AI training user input requesting for the AI training. According to various embodiments of the present disclosure, the plurality of initial setting user input may be input through an initial setting UI and the AI training user input may be input through an AI training UI.

According to various embodiments of the present disclosure, the initial setting user input may include a user input selecting a subject for the AI training, a user input selecting an AI algorithm from AI algorithms, a user input determining at least one type of input data for the AI training, and a user input determining a plurality of behavior patterns of the subject to be provided at the AI training. Furthermore, the initial setting user input may further include a user input determining parameter and structure provided based on the selected AI algorithm.

According to various embodiments of the present disclosure, the AI training user input may include the input data input by the user based on the determined type of the input data and one behavior pattern selected from the plurality of behavior patterns.

According to various embodiments of the present disclosure, user input receiving unit 120 may receive an invitation user input allowing another user to participate in the AI training. The invitation user input may be received through an application providing the AI training service by selecting another user stored another application (e.g., a phone book application or SNS (Social Networking Service) application, etc.) interlocked with the application.

According to various embodiments of the present disclosure, user input receiving unit 120 may receive a user input requesting for information on an AI training algorithm. According to various embodiments of the present disclosure, the information on the AI training algorithm may be programming/coding data corresponding to the AI training executed so far or data simply showing a training state of the subject as the result of the AI training.

According to various embodiments of the present disclosure, user input receiving unit 120 may receive a user input requesting for transmitting the information on the AI training algorithm to external device 500.

Communication unit 140 may transmit and receive data through network 600. According to various embodiments of the present disclosure, communication unit 140 may be a communication module of first electronic device 100.

Communication unit 140 may transmit, to service providing server 200, the plurality of the initial setting user inputs received at user input receiving unit 120. According to various embodiments of the present disclosure, communication unit 140 may transmit, to service providing server 200, the plurality of the initial setting user inputs all at once or after all of the initial setting user inputs are received. Otherwise, communication unit 140 may transmit, to service providing server 200, each of the initial setting user inputs in turn depending on the order that each of the initial setting user inputs is received.

It is described that communication unit 140 transmit the user inputs to service providing server 200 for convenience of explanation, however, actually it may be not the user inputs but a plurality of data corresponding each of the user inputs that communication unit 140 may transmit to service providing server 200. Furthermore, hereinafter, above description may be applied to data that communication unit 140 transmits or receives as well as user inputs.

Communication unit 140 may transmit, to service providing server 200, the AI training user input received at user input receiving unit 120. According to various embodiments of the present disclosure, communication unit 140 may receive, from service providing server 200, data corresponding to the AI training executed by service providing server 200 in response to the transmitted AI training user input.

According to various embodiments of the present disclosure, communication unit 140 may transmit, to service providing server 200, the invitation user input received at user input receiving unit 120. If the invitation for the another user is executed by not service providing server 200 but processor 160, communication unit 140 may transmit the invitation user input to second electronic device 300.

According to various embodiments of the present disclosure, communication unit 140 may request service providing server 200 to transmit the information on the AI training algorithm. Furthermore, communication unit 140 may receive the information on the AI training algorithm from service providing server 200.

According to various embodiments of the present disclosure, communication unit 140 may transmit, to external device 500, the information on the AI training algorithm directly or through service providing server 200.

Processor 160 may include one or more of a CPU (Central Processing Unit), an AP (Application Processor), or a CP (Communication Processor). Processor 160 may perform, for example, calculation or data processing about control and/or communication of at least another of the components of first electronic device 100 such as user input receiving unit 120, communication unit 140, or memory 180.

Processor 160 may generate the initial setting UI and the AI training UI. For example, processor 160 may generate the initial setting UI and the AI training UI by using data pre-stored in memory 180 or data received from service providing server 200. Processor 160 may provide the user with the generated initial setting UI and the generated AI training UI through a display device.

According to various embodiments of the present disclosure, processor 160 may preprocess the input data included the AI training user input. Through the preprocessing a data size of the input data may be reduced, and it may shorten a response time while communicating with service providing server 200.

According to various embodiments of the present disclosure, processor 160 may provide, on the AI training UI, data corresponding to the AI training received from service providing server 200. For example, if the AI training matching the text "sit down" with the behavior pattern "sitting down" is executed, processor 160 may provide, through the AI training UI, the user with an action that the pet puppy is sitting down in response to the text "sit down."

Memory 180 may store data, for example, instructions about operations performed by first electronic device 100. In this case, the data stored in the memory 180 may include data input and output between respective components inside first electronic device 100 and may include data input and output between components outside first electronic device 100 and components inside first electronic device 100. For example, memory 180 may store information on the initial setting user inputs received at user input receiving unit 120. Furthermore, memory 180 may store the information on the AI training algorithm received from service providing server 200.

According to various embodiments of the present disclosure, memory 180 may include a hard disc drive, a ROM (Read Only Memory), a RAM (Random Access Memory), a flash memory, a memory card, and the like inside or outside first electronic device 100.

It should be well understood to those skilled in the art that user input receiving unit 120, communication unit 140, processor 160, and memory 180 may be implemented to be independent of each other or may be implemented such that one or more of them are integrated into one device in first electronic device 100.

Figure 3:
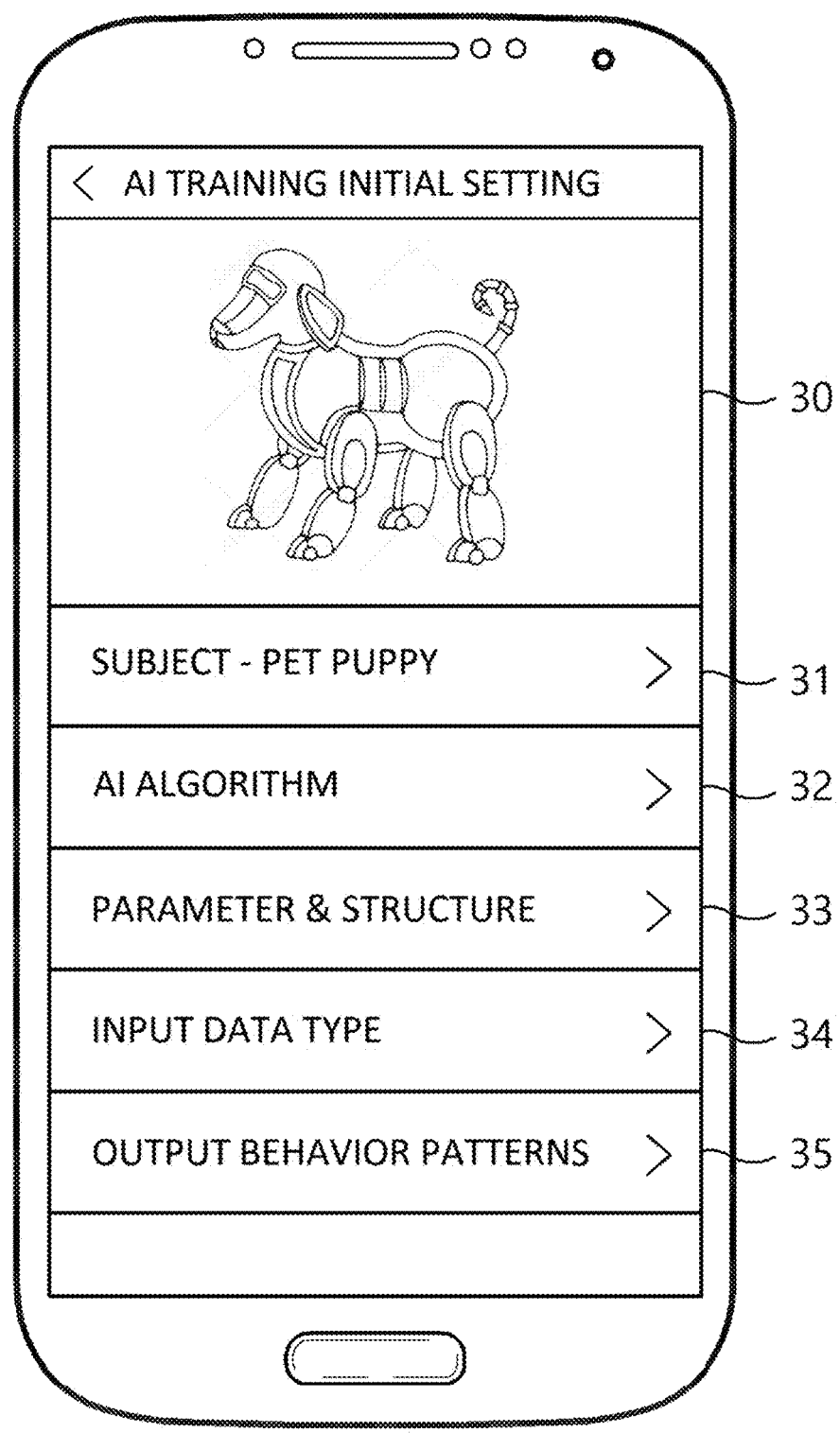
FIG. 3 is a drawing illustrating an initial setting UI (User Interface) displayed on a screen of an electronic device according to various embodiments of the present disclosure.

FIG. 3 is a drawing illustrating an initial setting UI (User Interface) displayed on a screen of an electronic device according to various embodiments of the present disclosure.

The initial setting UI may be comprised to perform an initial setting for an AI training as a preliminary step of the AI training. Referring to FIG. 3, through the initial setting UI may include items of a subject 31 for the AI training, an AI algorithm 32, a parameter and a structure 33, a type of input data 34, and an output behavior patterns 35.

According to various embodiments of the present disclosure, the user may set subject 31 for the AI training, AI algorithm 32, parameter and structure 33, type of the input data 34, and output behavior patterns 35 by selecting each of items.

The initial setting UI shown in FIG. 3 may represent a moment that the pet puppy is selected for subject 31. The initial setting UI may display an image corresponding to the selected pet puppy on a subject area 30. Referring to FIG. 3, the pet puppy is shown as a robot dog, however, according to various embodiments of the present disclosure, the pet puppy may be described as a real puppy.

Figure 4:
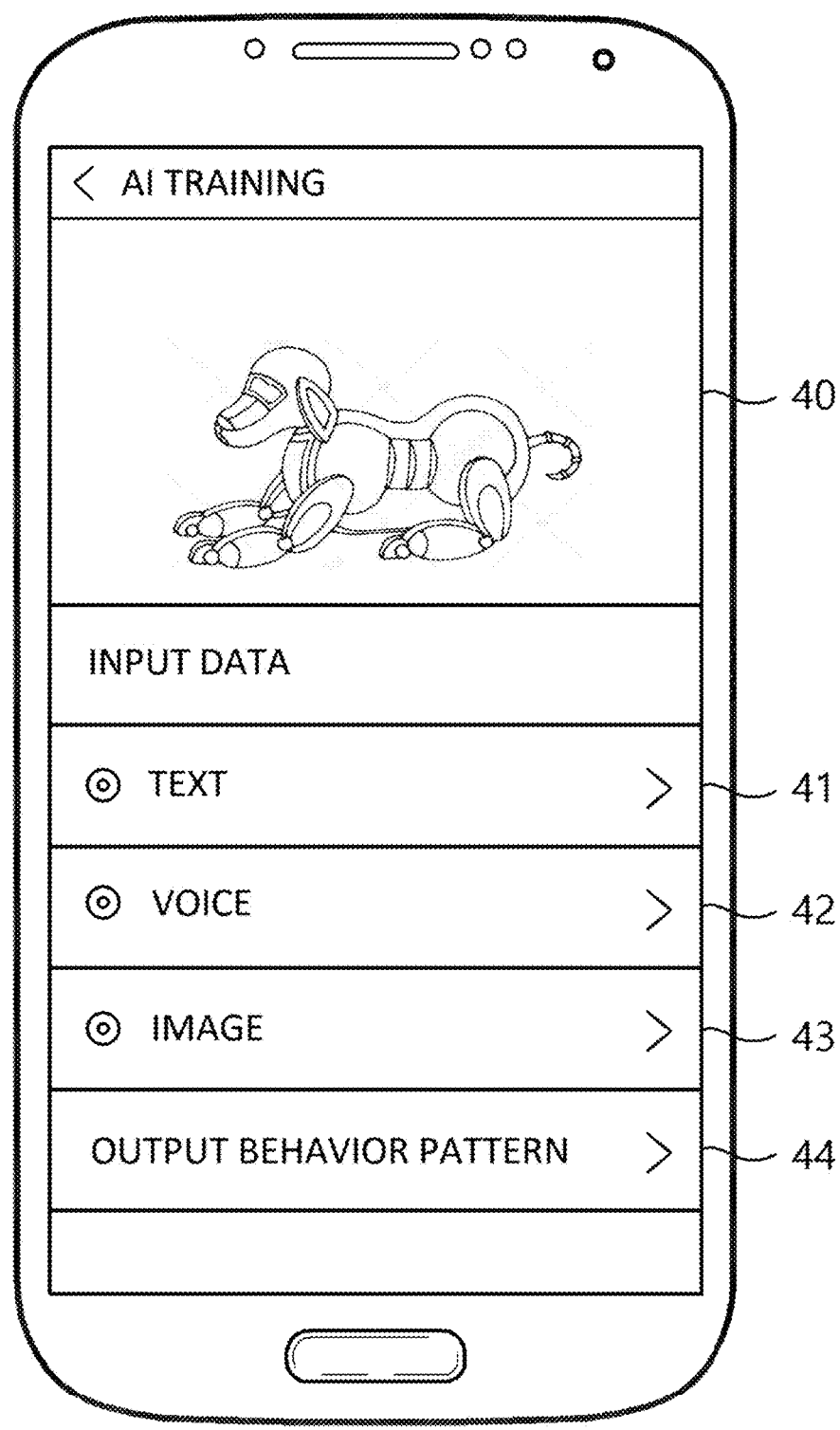
FIG. 4 is a drawing illustrating an AI training UI (User Interface) displayed on a screen of an electronic device according to various embodiments of the present disclosure.

FIG. 4 is a drawing illustrating an AI training UI (User Interface) displayed on a screen of an electronic device according to various embodiments of the present disclosure.

The AI training UI in FIG. 4 may be to request service providing server 200 to execute an AI training, a user may select a type of input data and a behavior pattern 44. Referring to FIG. 4, the input data may be input by selecting at least one of the types of the input data including a text 41, a voice 42, and an image 43. The type of the input data may include at least one type determined through type of the input data 34 of the initial setting UI in FIG. 3. Furthermore, if behavior pattern 44 may selected, a plurality of behavior patterns determined through output behavior patterns 35 of the initial setting UI in FIG. 3 may be displayed and one of the plurality of the behavior patterns may be selected.

The AI training UI shown in FIG. 4 may represent a moment that a behavior pattern "sitting down" is selected for behavior pattern 44. The AI training UI may display an image corresponding to the selected behavior pattern on a behavior pattern area 40.

First electronic device 100 may display the behavior pattern "sitting down" of the pet puppy on the behavior pattern area 40 by using data prestored in memory 180 when the behavior pattern "sitting down" is selected. According to various embodiments of the present disclosure, first electronic device 100 may transmit, to service providing server 200, the input data and the selected behavior pattern "sitting down", and may display the behavior pattern "sitting down" by using data received from service providing server 200 in response to the transmitted behavior pattern "sitting down."

Figure 5:
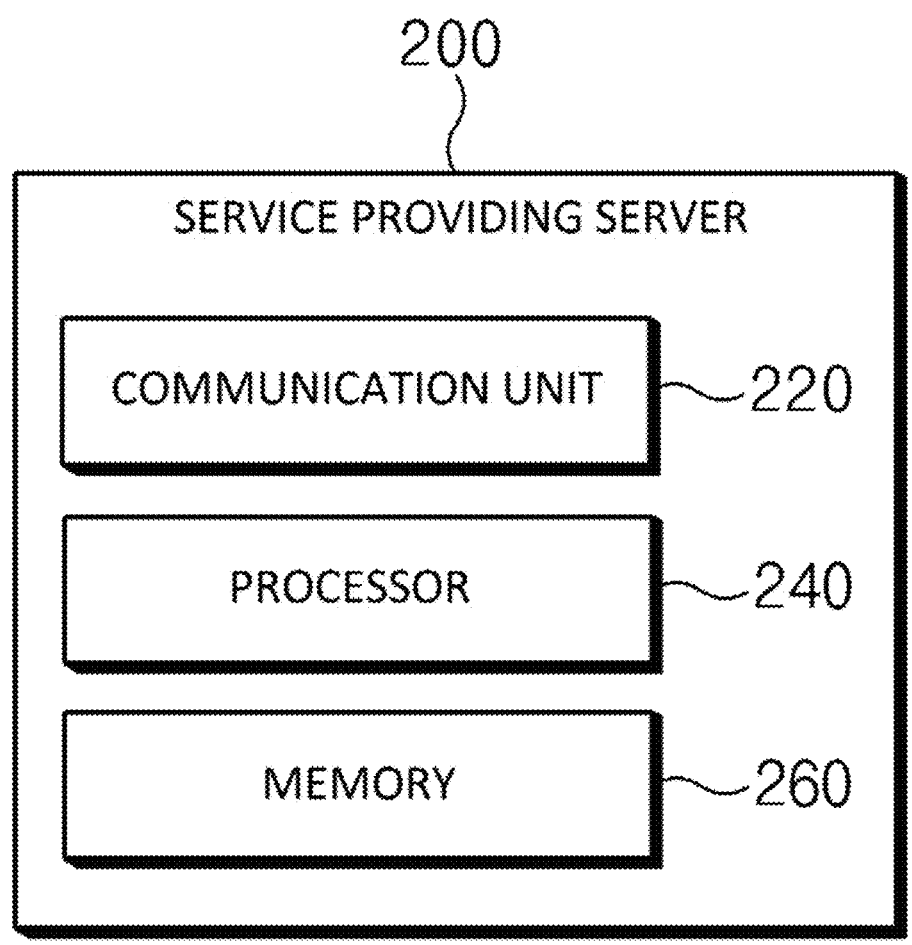
FIG. 5 is a block diagram illustrating a configuration of a service providing server according to various embodiments of the present disclosure.

FIG. 5 is a block diagram illustrating a configuration of a service providing server according to various embodiments of the present disclosure. Service providing server 200 may include a communication unit 220, a processor 240, and a memory 260. Herein, service providing server 200 shown in FIG. 5 may be only an implementation example, and various modifications are possible according to the elements shown in FIG. 5.

Communication unit 220 may transmit and receive data through network 600. According to various embodiments of the present disclosure, communication unit 220 may be a communication module of service providing server 200.

Communication unit 220 may receive, from first electronic device 100, data corresponding to a plurality of initial setting user inputs. Communication unit 220 may receive each of the data respectively corresponding to the plurality of the initial setting user inputs all at once or separately. Communication unit 220 may transmit a result of the initial setting for the AI training in response to the received initial setting user inputs.

Communication unit 220 may receive, from first electronic device 100, data corresponding to an AI training user input. Communication unit 220 may transmit, to first electronic device 100, data corresponding to an executed AI training in response to the received AI training user input.

According to various embodiments of the present disclosure, communication unit 220 may receive, from first electronic device 100, data corresponding to an invitation user input. Communication unit 220 may transmit, to second electronic device 300 that is owned by another user who is an invitee, a log of the invitation.

According to various embodiments of the present disclosure, communication unit 220 may receive, from first electronic device 100, a request for information on AI training algorithm. Communication unit 220 may transmit the requested information on AI training algorithm to first electronic device 100 in response to the request for the information on the AI training algorithm.

According to various embodiments of the present disclosure, communication unit 220 may receive, from first electronic device 100, a request for connection with external device 500. Communication unit 220 may transmit, to external device 500, data to be used to operate external device 500 in response to the request for the connection with external device 500. According to various embodiments of the present disclosure, the data to be used to operate external device 500 may be the information on the AI training algorithm.

Processor 240 may include one or more of a CPU (Central Processing Unit), an AP (Application Processor), or a CP (Communication Processor). Processor 240 may perform, for example, calculation or data processing about control and/or communication of at least another of the components of service providing server 200 such as communication unit 220, or memory 260.

Processor 240 may execute the initial setting for the AI training based on the data corresponding to the plurality of the initial setting user inputs received at communication unit 220. According to various embodiments of the present disclosure, processor 240 may execute the initial setting for the AI training and generate a chat room to be provided to the user of first electronic device 100. In this case, a range of the AI training requested on the chat room may be restricted to the initial setting.

According to various embodiments of the present disclosure, processor 240 may analyze and apply a parameter and a structure determined at the initial setting user input to execute the initial setting.

Processor 240 may execute the AI training based on the data corresponding to the AI training user input received at communication unit 220.

According to various embodiments of the present disclosure, processor 240 may interlock an account of the user of first electronic device 100 with an account of the invitee using second electronic device 300 based on the data corresponding to the invitation user input received at communication unit 220. According to various embodiments of the present disclosure, processor 240 may invite the invitee to the generated chat room that is provided to the user.

According to various embodiments of the present disclosure, processor 240 may generate the information on the AI training algorithm based on the request for the information received at communication unit 220. According to various embodiments of the present disclosure, processor 240 may generate the information on the AI training algorithm that is applicable to all or at least one of AI algorithms (e.g., perceptron, neural network, SVM, deep learning.) That is to say, the generated information on the AI training algorithm may be compatible with other information on the AI training algorithm generated by other AI algorithms.

Memory 260 may store data, for example, instructions about operations performed by service providing server 200. In this case, the data stored in the memory 260 may include data input and output between respective components inside service providing server 200 and may include data input and output between components outside service providing server 200 and components inside service providing server 200. For example, memory 260 may store the information on the initial setting user inputs generated by processor 240.

According to various embodiments of the present disclosure, memory 260 may include a hard disc drive, a ROM (Read Only Memory), a RAM (Random Access Memory), a flash memory, a memory card, and the like inside or outside service providing server 200.

It should be well understood to those skilled in the art that communication unit 220, processor 240, and memory 260 may be implemented to be independent of each other or may be implemented such that one or more of them are integrated into one device in service providing server 200.

Figure 6:
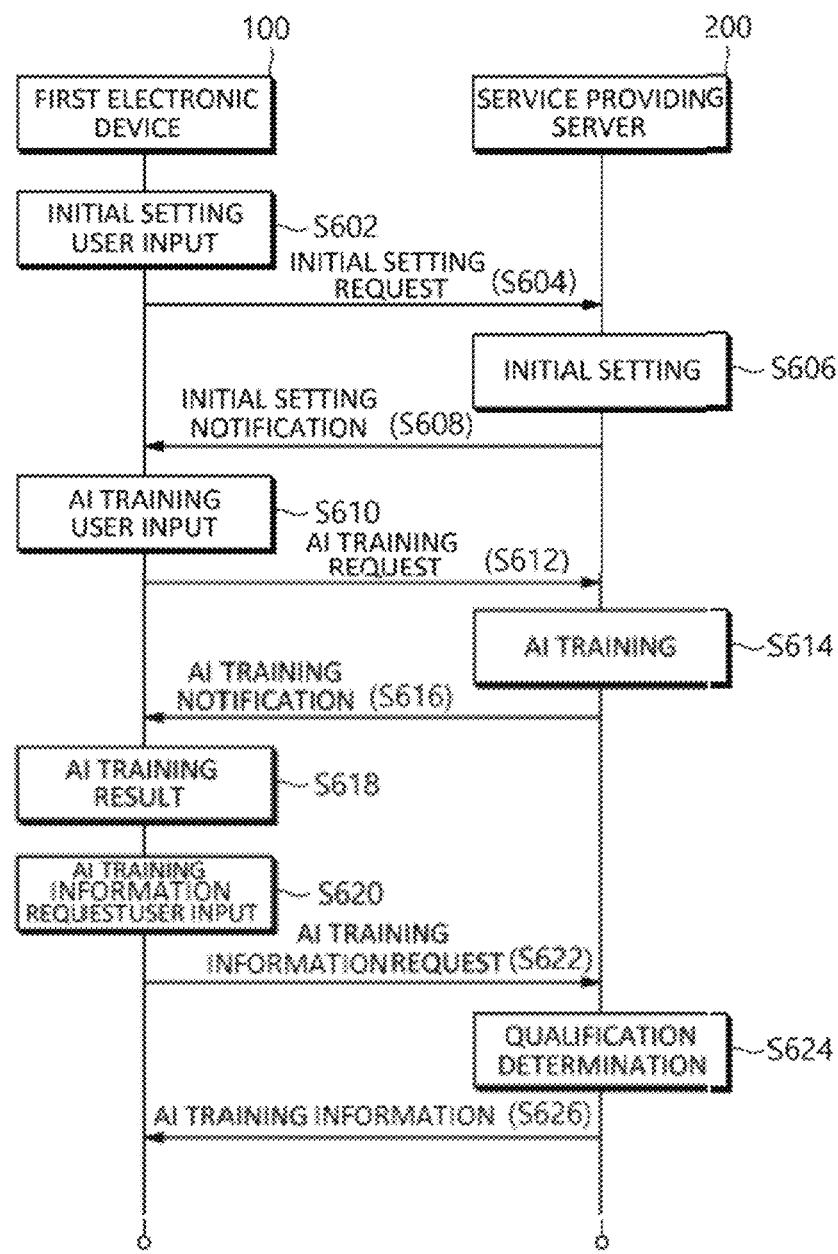
FIG. 6 is a drawing illustrating a method of providing a user-participating-type AI (Artificial Intelligence) training service according to various embodiments of the present disclosure.

FIG. 6 is a drawing illustrating a method of providing a user-participating-type AI (Artificial Intelligence) training service according to various embodiments of the present disclosure. The method of providing a user-participating-type AI training service according to the various embodiments illustrated in FIG. 7 may include operations sequentially processed in first electronic device 100 and service providing server 200 illustrated in FIG. 1 to FIG. 5. Accordingly, the descriptions of first electronic device 100 and service providing server 200 illustrated in FIG. 1 to FIG. 5, even though the descriptions are not provided below, may be applied to the method of providing a user-participating-type AI training service according to the various embodiments illustrated in FIG. 6.

In operation S602, first electronic device 100 may receive a user input requesting for an initial setting for AI training from a user of first electronic device 100. The user input requesting for the initial setting may include information on each of a subject for the AI training, an AI algorithm, a parameter of the AI algorithm, a structure of the AI algorithm, a type of input data, and behavior patterns.

In operation S604, first electronic device 100 may request service providing server 200 to execute the initial setting for the AI training based on the user input received in operation S602.

In operation S606, service providing server 200 may execute the initial setting for the AI training based on the request received in operation S604.

In operation S608, service providing server 200 may notify, to first electronic device 100, completion of the initial setting for the AI training executed in operation S606.

In operation S610, first electronic device 100 may receive a user input requesting for the AI training from the user. The user input requesting for the AI training may include the input data and a behavior pattern.

In operation S612, first electronic device 100 may request service providing server 200 to execute the AI training based on the user input requesting for the AI training received in operation S610.

In operation S614, service providing server 200 may execute the AI training based on the request received in operation S612.

In operation S616, service providing server 200 may notify, to first electronic device 100, completion of the AI training executed in operation S614. According to various embodiments of the present disclosure, service providing server 200 may transmit, to first electronic device 100, data corresponding to the executed AI training in addition to the notification.

In operation S618, first electronic device 100 may display, on a display device of first electronic device 100, a result of the AI training based on the completion notification of the AI training received in operation S616. For example, if the subject is a pet puppy and the input data includes a text "sit down" and a behavior pattern "sitting down," first electronic device 100 may provide the user, on the display device, with the pet puppy sitting down in response to the text "sit down."

In operation S620, first electronic device 100 may receive, from the user, a user input requesting for information on an AI training algorithm.

In operation S622, first electronic device 100 may transmit, to service providing server 200, a request for the information on the AI training algorithm based on the user input received in operation S620.

In operation S624, service providing server 200 may determine, based on the request received in operation S622, whether transmit the information on the AI algorithm to first electronic device 100 or not. According to various embodiments of the present disclosure, service providing server 200 may determine, based on the number of the AI training, accuracy or reliability of a result of the AI training, consistency, etc., whether transmit the information on the AI algorithm to first electronic device 100 or not.

If service providing server 200 determines to transmit, to first electronic device 100, the information on the AI training algorithm in operation S624, in operation S626, service providing server 200 may transmit the information on the AI training algorithm to first electronic device 100.

The order of operation S602 to operation S626 described in FIG. 6 may be just an example and thus is not limited thereto. That is, the order of the above-mentioned operations may mutually vary and some operations among them may be performed at the same time. Additionally, the above-mentioned operations may be repeated periodically at each predetermined time and may be performed again based on a user input inputted from the user.

Figure 7:
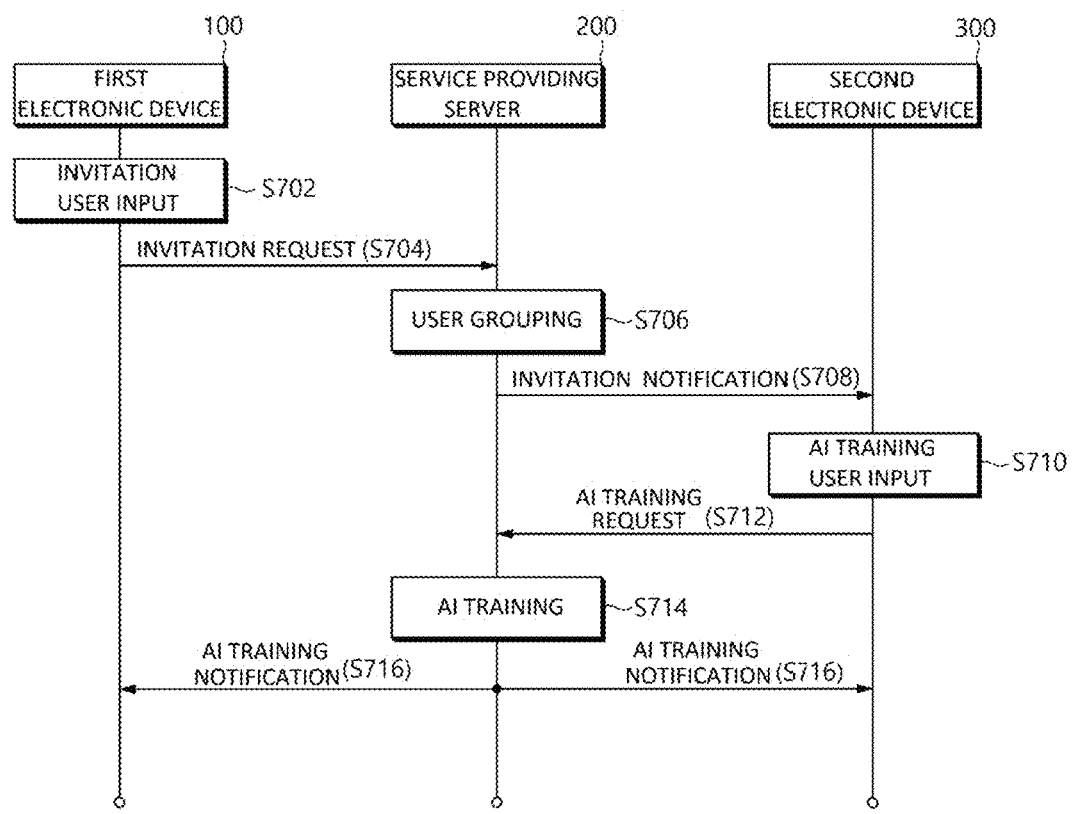
FIG. 7 is a drawing illustrating a method of providing a user-participating-type AI (Artificial Intelligence) training service according to various embodiments of the present disclosure.

FIG. 7 is a drawing illustrating a method of providing a user-participating-type AI (Artificial Intelligence) training service according to other various embodiments of the present disclosure.

The method of providing a user-participating-type AI training service according to the various embodiments illustrated in FIG. 7 may include operations sequentially processed in first electronic device 100, service providing server 200, and second electronic device 300 illustrated in FIG. 1 to FIG. 5. Accordingly, the descriptions of first electronic device 100, service providing server 200, and second electronic device 300 illustrated in FIG. 1 to FIG. 5, even though the descriptions are not provided below, may be applied to the method of providing a user-participating-type AI training service according to the various embodiments illustrated in FIG. 7.

In operation S702, first electronic device 100 may receive, from a user of first electronic device 100 (a first user), a user input inviting a user of second electronic device 300 (a second user).

In operation S704, first electronic device 100 may request service providing server 200 to invite the second user based on the user input received in operation S702.

In operation S706, service providing server 200 may administer accounts of the first user and the second user with grouping based on the request received in operation S704.

In operation S708, service providing server 200 may notify the invitation of the second user to second electronic device 300. According to various embodiments of the present disclosure, in operation S708, the invitation may be performed that service providing server 200 may invite an account of the second user into a chatroom generated by an account of the first user.

In operation S710, second electronic device 300 may receive a user input requesting for the AI training from the second user. The user input requesting for the AI training may include information on input data and a behavior pattern.

In operation S712, second electronic device 300 may request service providing server 200 to execute the AI training based on the user input received in operation S710.

In operation S714, service providing server 200 may execute the AI training based on the request received in operation S712.

In operation S716, service providing server 200 may notify completion of the AI training executed in operation S714 to first electronic device 100 and second electronic device 300. According to various embodiments of the present disclosure, service providing server 200 may notify the completion of the AI training on the chat room for the account of the first user and the second user.

The order of operation S702 to operation S716 described in FIG. 7 may be just an example and thus is not limited thereto. That is, the order of the above-mentioned operations may mutually vary and some operations among them may be performed at the same time. Additionally, the above-mentioned operations may be repeated periodically at each predetermined time and may be performed again based on a user input inputted from the user.

Figure 8:
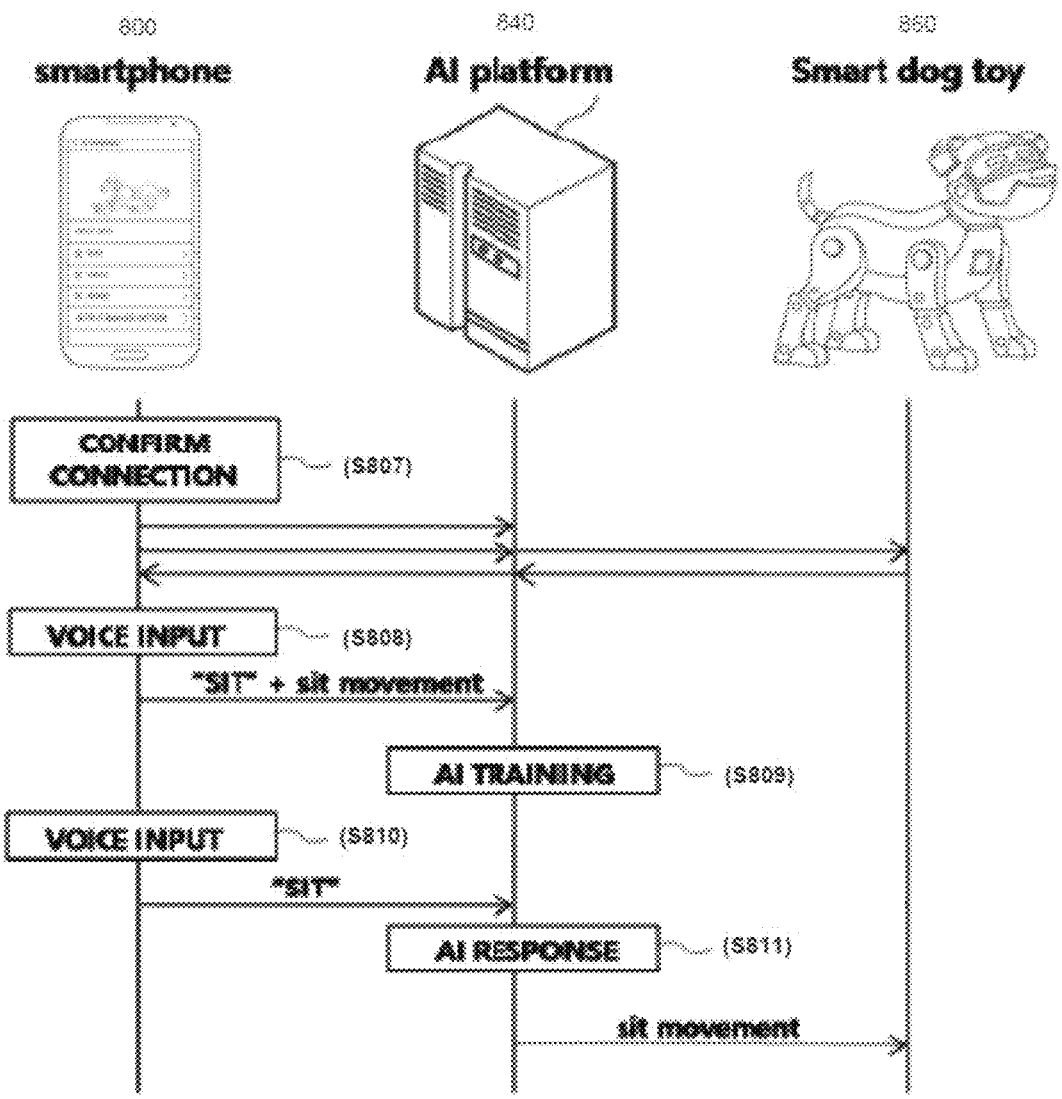
FIG. 8 is a drawing illustrating a use case of the platform with a smart pet toy according to embodiments of the present disclosure.

FIG. 8 is a drawing illustrating a use case of the platform with a smart pet toy.

A smart pet toy may collect voice of a user through a microphone as an input.

A smart pet toy may have a set of possible mechanical movements as an output.

Types of available input and output of a smart pet such as video and sound can be added or changed through the platform software update.

AI training of a smart pet toy's AI behavior may be performed via a smartphone.

The user smartphone 800 may confirm connection with the platform 840 and a smart dog toy 860 (S807).

The user may say "SIT" using a microphone of the smartphone 840 and select "sit movement" displayed in the smartphone UI (S808).

The AI platform 840 may train AI algorithm with user's "SIT" voice as input and reinforce "dog sitting movement" as a paired output (S809).

The operations S807-S809 can be repeated with different input and output pairs. For example, the user can say "DOWN" and pair with "sit movement". Also, user can say "STAY LOW" and pair with "sit movement".

An input voice received from the smartphone 800 may be sent to the AI platform 840 (S810).

In response, the platform 840 may obtain AI response based on the voice input "SIT" from the smartphone 800, and transmit instructions to the smart dog toy 860 such that the toy performs a sitting 5 movement (S811).

Figure 9:
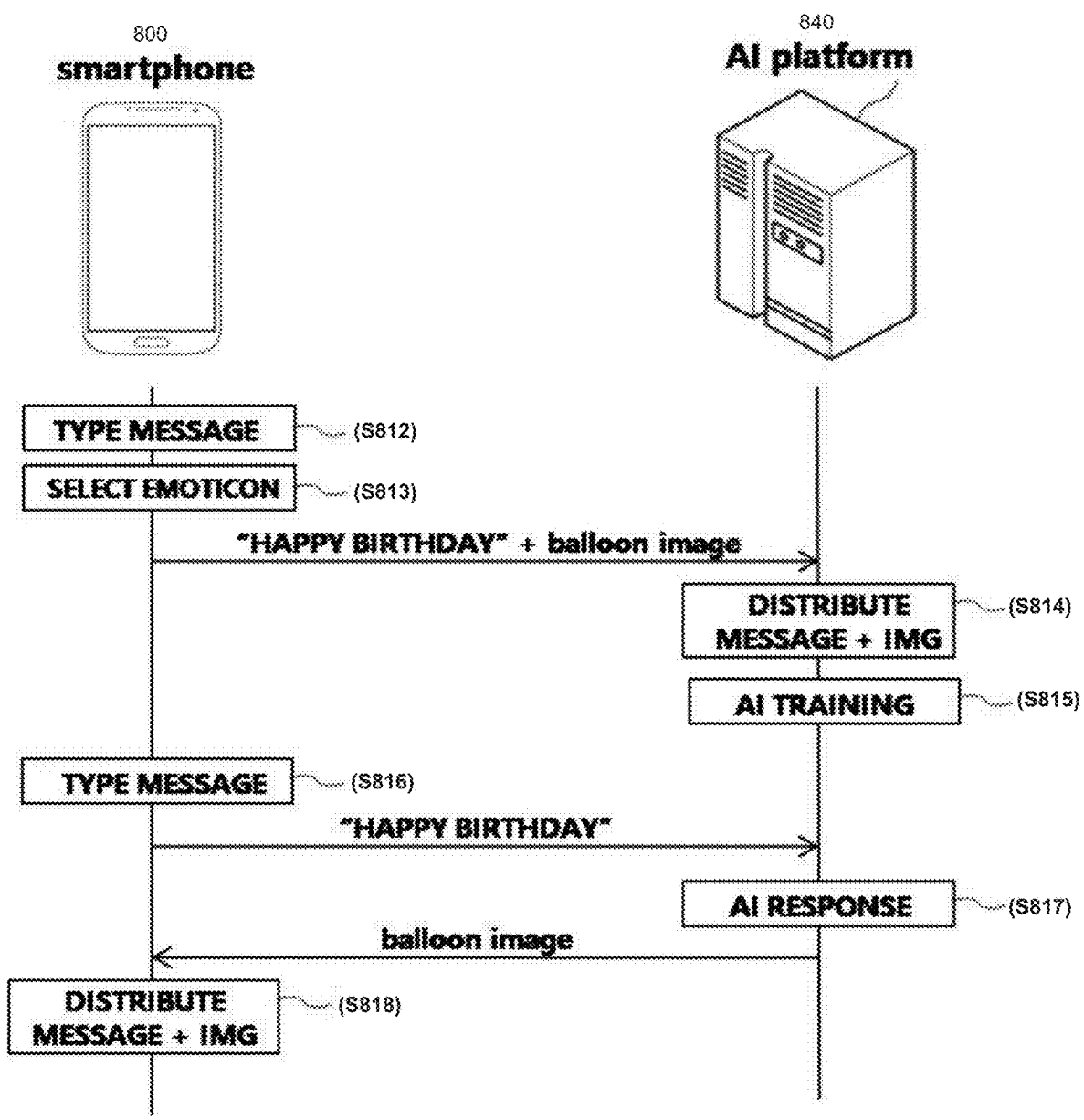
FIG. 9 is a drawing illustrating a use case of the platform with a smartphone messaging application according to embodiments of the present disclosure.

FIG. 9 is a drawing illustrating a use case of the platform with a smartphone messaging application. Here, the user may exchange messages with other users via the smartphone application. The user may select an emoticon picture paired to a certain message. The message may serve as an input of AI training and the emoticon pictures may serve as an output of AI training.

In FIG. 9, the smartphone 800 may serve as both the first electric device 100 and the second electric device 300.

The user may type a chat message "HAPPY BIRTHDAY" in the smartphone application (S812) and select an emoticon picture of "balloon" (S813).

The AI platform 840 may distribute the message and emoticon to other users (S814).

The AI platform 840 may perform AI training with the received input message and output emoticon (S815).

The operations S812-S815 may be repeated with different input and output pairs.

The user may type in and send a new message without any emoticon selected (S816). The AI platform 840 may generate a paired image using AI algorithm (S817).

A new message may be distributed together with a selected image from AI algorithm (S818).

Figure 10:
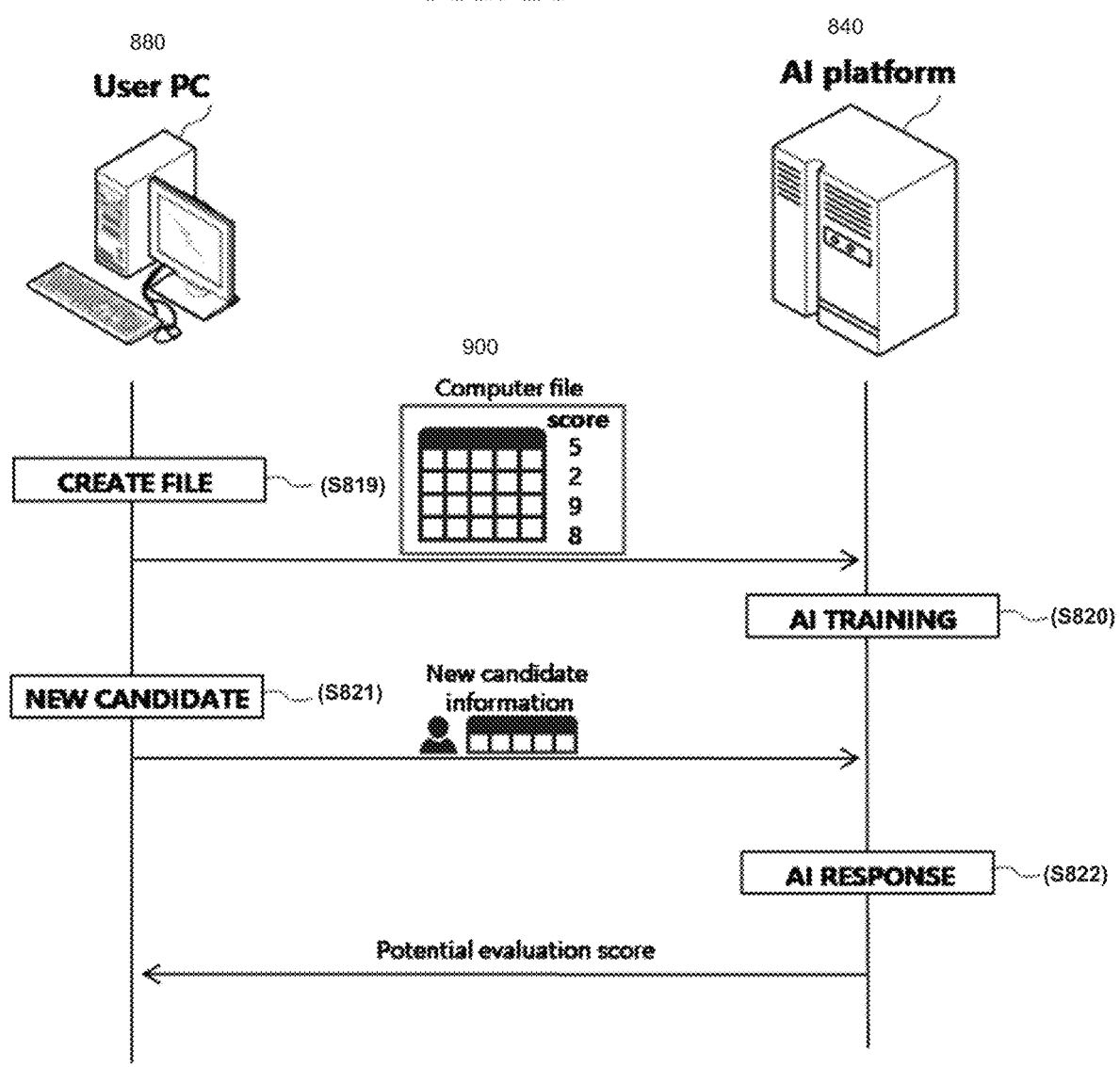
FIG. 10 is a drawing illustrating a use case of the platform with a HR (Human Resource) recruiting evaluation system according to embodiments of the present disclosure.

FIG. 10 is a drawing illustrating a use case of the platform with a HR (Human Resource) recruiting evaluation system. Here, the user may prepare a computer file containing a table of detail information of employees paired with each person's performance evaluation score.

In FIG. 10, the user PC 880 may serve as both the first electric device 100 and the second electric device 300.

In FIG. 10, the computer file 900 may serve as an input and the evaluation score of a candidate employee may serve as an output.

The user in the HR department of a company may collect current employee information and create the computer file 900 (S819). Examples of employee information may contain education, work history, career length, certifications, commute distance, and so on. Each employee data may be paired with an employee evaluation score.

The AI platform 840 may train an AI model using employee data as an input and evaluation score as an output (S820).

In recruiting, the user may send new candidate information to the AI platform 840 (S821).

The AI platform 840 may perform AI algorithm and return expected employee evaluation score of a potential candidate (S822).

FIG. 11 is a drawing illustrating a use case of the platform in training an AI algorithm.

The AI platform 840 may receive necessary information for initializing the AI algorithm (S823).

The AI platform 840 may receive an input dataset from a user device 910. AI training is performed by iterating through the input dataset and updating weights of AI algorithm connections. Each input data instance may reinforce the behavior of the AI algorithm response (S824).

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

According to various embodiments of the present disclosure, an electronic device, a service providing server, and a system providing a user-participating-type AI training service may provide the user with items of a subject for an AI training, an AI algorithm, a type of input data for the AI training, and a plurality of behavior patterns through a predetermined UI (User Interface) so that the user can easily select each of the items. An initial setting for the AI training may be set from the selection and the user may simply execute the AI training for the subject. Various embodiments of the present disclosure may make the user who is not an expert to execute the AI training and get an AI model of the user's chosen form. The user may embody behavior patterns of a robot by interlocking the AI model with the robot.

Various embodiments of the present disclosure may be embodied in a storage medium which includes instruction codes which are executable by a computer, such as a program module which is executable by the computer. A computer readable medium may be any usable medium which can be accessed by the computer and include all volatile and/or non-volatile and removable and/or non-removable media. Further, the computer readable medium may include any or all computer storage and communication media. The computer storage medium may include any or all volatile/non-volatile and removable/non-removable media embodied by a certain method or technology for storing information such as, for example, computer readable instruction code, a data structure, a program module, or other data. The communication medium may include the computer readable instruction code, the data structure, the program module, or other data of a modulated data signal such as a carrier wave, or other transmission mechanism, and includes information transmission mediums.

The above description of various embodiments of the present disclosure may be provided for the purpose of illustration, and it will be understood by those skilled in the art that various changes and modifications may be easily made without changing a technical conception and/or any essential features of the various embodiments. Thus, above-described various embodiments may be examples in all aspects, and do not limit the present disclosure. For example, each component described to be of a single type can be implemented in a distributed manner. Likewise, components described to be distributed can be implemented in a combined manner.

The scope of the present disclosure may be defined by the following claims, and it shall be understood that all modifications and embodiments conceived from the meaning and scope of the following claims and their equivalents are included in the scope of the present disclosure.

What is claimed is:

1. An electronic device comprising a user interface for providing a user-participating-type artificial intelligence (AI) training service, the device comprising:
   a memory;
   a communication unit configured to communicate with a service providing server;

a user input receiver configured to receive, from a user of the AI training service, the user input receiver comprising:
   a user interface (UI) configured to receive a plurality of user inputs for AI training, the user inputs comprising:
      a first user input for selecting a subject for the AI training, the subject corresponding to an external electronic device, the selection of the subject defining a plurality of behavior patterns to be trained,
      a second user input for selecting an AI algorithm from a plurality of AI algorithms to train the subject,
      a third user input for selecting a parameter and structure that includes a number of layers for the AI algorithm, a node for each of the layers, a function, and a number of iterations for training the AI algorithm,
      a fourth user input for determining at least one type of one or more training input datasets for the AI training, and
      a fifth user input for determining a first behavior pattern of the plurality of behavior patterns of the subject to be used for the AI training, the first behavior pattern corresponding to the at least one type of the one or more training input datasets,
   in response to the subject, the AI algorithm, the parameter and structure, the at least one type of training input data, and the first behavior pattern determined by the UI, the receiver further configured to receive:
      an AI training request for requesting the AI training to be initiated,
      a sixth user input for requesting information on an AI training algorithm that has been trained by the service providing server according to the AI training request, the information on the AI training algorithm comprising programming and coding data of the AI training algorithm corresponding to a result of the AI training executed thus far by the service providing server, or data indicating a training state of the subject as the result of the AI training, and
      a seventh user input for transmitting the received information on the AI training algorithm to the external electronic device; and
   a processor configured to:
      generate the UI based on at least one of data stored in the memory or data received from the service providing server, and
      control the communication unit to:
         in response to the AI training request, send, to the service providing server, the selected subject, the AI algorithm, the parameter and structure, the determined type of the one or more training input datasets, and the first behavior pattern selected or determined based on the first to fifth user inputs,
         receive, from the service providing server, the programming and coding data of the AI training algorithm, and
         send the programming and coding data of the AI training algorithm to the external electronic device based on the seventh user input such that the external electronic device operates and communicates with the electronic device based on the received programming and coding data,
      the processor further configured to trigger the service providing server to perform AI training by:
         initializing the AI algorithm selected in the second user input; and
         updating and reinforcing the AI algorithm by iterating through the one or more training input datasets based on the selected number of iterations and updating weights of the AI algorithm, according to the selected parameter and structure in the third user input.

2. The electronic device of claim 1, wherein the processor is further configured to control the communication unit to send the programming and coding data of the AI training algorithm to a second electronic device such that the second electronic device communicates with the external electronic device based on the result of the AI training algorithm.

3. The electronic device of claim 1, wherein the user input receiver is further configured to receive an invitation user input request allowing a second electronic device to participate in the AI training,
   wherein, in response to the invitation user input, the processor is further configured to control the communication unit to send to the second electronic device, either directly or through the service providing server, data corresponding to the invitation user input.

4. The electronic device of claim 1, wherein the at least one type of training input data comprises one or more of voice data, image data, or text data, wherein the processor is further configured to preprocess the one or more of voice data, image data, or text data to reduce a data size of the one or more of voice data, image data, or text data.

5. The electronic device of claim 1, wherein the type of input data comprises: text data, voice data, or image data, and
   wherein the processor is configured to limit a data size of input data included in the AI training user input is limited within a predetermined threshold.

6. The electronic device of claim 1, wherein the external electronic device comprises a robot configured to understand a plurality of behavior patterns, and operate based on the result the AI training executed by the user.

7. The electronic device of claim 1, wherein:
   the first user input comprises a human resource recruiting evaluation system,
   the fourth user input data comprises a file comprising a table of employee information paired with each employee's performance evaluation score, the employee information comprising: education, work history, career length, certifications, and commute distance, and
   wherein the AI response comprises a computed potential candidate evaluation score.

8. The electronic device of claim 4, wherein the processor is configured to convert:
   the voice input data or image data into text data, or the voice input data or image data to a different file format, or compress the voice input data or image data.

9. A service providing server for providing a user-participating-type artificial intelligence (AI) training service by communicating with an electronic device, the server comprising:
   a memory;
   a communication unit configured to receive, from an electronic device of a user, a plurality of user inputs for AI training, the user inputs comprising:
      a first user input representing a subject for the AI training, the subject corresponding to an external electronic device, the selection of the subject defining a plurality of behavior patterns to be trained, a second user input representing an AI algorithm from a plurality of AI algorithms to train the subject, a third user input representing a parameter and structure that includes a number of layers for the AI algorithm, a node for each of the layers, a function, and a number of iterations for training the AI algorithm, a fourth user input representing at least one type of one or more training input datasets for the AI training, and a fifth user input representing a first behavior pattern of the plurality of behavior patterns of the subject to be used for the AI training, the first behavior pattern corresponding to the at least one type of the one or more training input datasets, in response to the subject, the AI algorithm, the parameter and structure, the at least one type of training input data, and the first behavior pattern, the communication unit further configured to receive from the electronic device:

an AI training request for requesting the AI training to be initiated, a sixth user input representing a request for information on an AI training algorithm that has been trained by the service providing server according to the AI training request, the information on the AI training algorithm comprising programming and coding data of the AI training algorithm corresponding to a result of the AI training executed thus far by the service providing server, or data indicating a training state of the subject as the result of the AI training, and a seventh user input representing a request for transmitting the information on the AI training algorithm to an external electronic device; and a processor configured to:

generate the information on the AI training algorithm comprising programming and coding data of the AI training algorithm corresponding to a result of the AI training executed thus far by the service providing server, or data indicating a training state of the subject as the result of the AI training, and control the communication unit to:

receive, from the electronic device, the selected subject, the AI algorithm, the parameter and structure, the determined type of the one or more training input datasets, and the first behavior pattern selected or determined based on the first to fifth user inputs, send, to the electronic device, the programming and coding data of the AI training algorithm, and send the programming and coding data of the AI training algorithm to the external electronic device based on the seventh user input such that the external electronic device operates and communicates with the electronic device based on the received programming and coding data, the processor further configured to perform AI training by:

initializing the AI algorithm selected in the second user input; and updating and reinforcing the AI algorithm by iterating through the one or more training input datasets based on the selected number of iterations and updating weights of the AI algorithm, according to the selected parameter and structure in the third user input.

10. The service providing server of claim 9, wherein the information on the AI training algorithm is exclusive information for a user account of the user.

11. The service providing server of claim 10, wherein the processor is configured to generate the information on the AI training algorithm if the number of the AI training being executed exceeds a predetermined threshold.

12. The service providing server of claim 9, wherein the communication unit is further configured to receive, from the electronic device, an invitation request for allowing another user to participate in the AI training, and wherein the processor is further configured to group the user and the another user for the AI training.

13. The service providing server of claim 9, wherein:

the first user input comprises a human resource recruiting evaluation system, the fourth user input data comprises a file comprising a table of employee information paired with each employee's performance evaluation score, the employee information comprising: education, work history, career length, certifications, and commute distance, and wherein the AI response comprises a computed potential candidate evaluation score.

14. A method for providing a user-participating-type artificial intelligence (AI) training service with an electronic device, the method comprising:

displaying, through a screen of the electronic device, an initial setting user interface;

receiving, from a user of the AI training service, a plurality of user inputs for AI training, wherein the selection includes:

a first user input for selecting a subject for the AI training, the subject corresponding to an external electronic device, the selection of the subject defining a plurality of behavior patterns to be trained, a second user input for selecting an AI algorithm from a plurality of AI algorithms to train the subject, a third user input for selecting a parameter and structure that includes a number of layers for the AI algorithm, a node for each of the layers, a function, and a number of iterations for training the AI algorithm, a fourth user input for determining at least one type of one or more training input datasets for the AI training, and a fifth user input for determining a first behavior pattern of the plurality of behavior patterns of the subject to be used for the AI training, the first behavior pattern corresponding to the at least one type of the one or more training input datasets, in response to the subject, the AI algorithm, the parameter and structure, the at least one type of training input data, and the first behavior pattern determined by the UI, receiving:

an AI training request for requesting the AI training to be initiated, a sixth user input for requesting information on an AI training algorithm that has been trained by the service providing server according to the AI training request, the information on the AI training algorithm comprising programming and coding data of the AI training algorithm corresponding to a result of the AI training executed thus far by the service providing server, or data indicating a training state of the subject as the result of the AI training, and a seventh user input for transmitting the received information on the AI training algorithm to the external electronic device;

generating, by a processor of the electronic device, the UI based on at least one of data stored in the memory or data received from the service providing server;

controlling, by the processor, a communication unit of the electronic device to:

in response to the AI training request, send, to the service providing server, the selected subject, the AI algorithm, the parameter and structure, the determined type of the one or more training input datasets, and the first behavior pattern selected or determined based on the first to fifth user inputs, receive, from the service providing server, the programming and coding data of the AI training algorithm, and send the programming and coding data of the AI training algorithm to the external electronic device based on the seventh user input such that the external electronic device operates and communicates with the electronic device based on the received programming and coding data; and triggering, by the processor, the service providing server to perform AI training by:

initializing the AI algorithm selected in the second user input; and updating and reinforcing the AI algorithm by iterating through the one or more training input datasets based on the selected number of iterations and updating weights of the AI algorithm, according to the selected parameter and structure in the third user input.

15. The method of claim 14, further comprising sending, from the service providing server, the programming and coding data to a second electronic device such that the second electronic device communicates with the external electronic device based on the result of the AI training algorithm.

16. The method of claim 14, further comprising sending, from the service providing server, the programming and coding data to an external electronic device that is a robot configured to understand a plurality of behavior patterns, and operate based on the result the AI training executed by the user.

17. The method of claim 14, wherein:

the first user input comprises a human resource recruiting evaluation system, the fourth user input data comprises a file comprising a table of employee information paired with each employee's performance evaluation score, the employee information comprising: education, work history, career length, certifications, and commute distance, and wherein, upon execution of the AI training, the AI response computes a potential candidate evaluation score.

* * * * *